(12) United States Patent
Ohishi et al.

(10) Patent No.: US 10,730,129 B2
(45) Date of Patent: *Aug. 4, 2020

(54) MACHINE COMPONENT AND METHOD FOR PRODUCING THE SAME

(71) Applicant: KOMATSU LTD., Tokyo (JP)

(72) Inventors: Masayuki Ohishi, Neyagawa (JP); Masaharu Amano, Hirakata (JP)

(73) Assignee: KOMATSU LTD., Tokyo (JP)

( * ) Notice: Subject to any disclaimer, the term of this patent is extended or adjusted under 35 U.S.C. 154(b) by 488 days.

This patent is subject to a terminal disclaimer.

(21) Appl. No.: 15/500,630

(22) PCT Filed: Nov. 18, 2014

(86) PCT No.: PCT/JP2014/080540
§ 371 (c)(1),
(2) Date: Jan. 31, 2017

(87) PCT Pub. No.: WO2016/079813
PCT Pub. Date: May 26, 2016

(65) Prior Publication Data
US 2017/0216949 A1  Aug. 3, 2017

(51) Int. Cl.
*B62D 55/21* (2006.01)
*B23K 9/04* (2006.01)
(Continued)

(52) U.S. Cl.
CPC .................. *B23K 9/04* (2013.01); *B22F 7/06* (2013.01); *B23K 9/046* (2013.01); *B23K 9/173* (2013.01);
(Continued)

(58) Field of Classification Search
CPC ...... B62D 55/20; B62D 55/205; B62D 55/21; B23K 9/04; B23K 9/042; B23K 9/044;
(Continued)

(56) References Cited

U.S. PATENT DOCUMENTS 2,003,019 A * 5/1935 Strobel ................ B23K 31/025
148/26
2,334,350 A * 11/1943 Neuhaus ............. E21B 17/1085
175/325.1
(Continued)

FOREIGN PATENT DOCUMENTS

CN       102348898 A    2/2012
JP       H01-202332 A   8/1989
(Continued)

OTHER PUBLICATIONS

Machine translation of JP2013-46928, 16 pages (Year: 2013).*
Jan. 13, 2015 International Search Report issued in International Patent Application No. PCT/JP2014/080540.

*Primary Examiner* — Jason R Bellinger
(74) *Attorney, Agent, or Firm* — Oliff PLC

(57) ABSTRACT

A sprocket wheel, which is an example of the machine component, includes a base made of a first metal, and an overlay disposed in contact with the base to cover at least a part of a surface of the base. The overlay includes a matrix made of a second metal, and hard particles dispersed in the matrix. The surface of the overlay is a forged surface. The hard particles located in an overlay surface region within an average particle diameter of the hard particles from the surface of the overlay are arranged side by side while being embedded in the overlay.

7 Claims, 20 Drawing Sheets

(51) Int. Cl.
    *B23K 9/173*      (2006.01)
    *B23K 9/23*       (2006.01)
    *B23K 9/32*       (2006.01)
    *C22C 32/00*      (2006.01)
    *B22F 7/06*       (2006.01)
    *B62D 55/12*      (2006.01)
    *B62D 55/135*     (2006.01)
    *B23K 101/30*     (2006.01)
    *B23K 103/04*     (2006.01)
    *B23K 101/06*     (2006.01)
    *B22F 5/08*       (2006.01)
    *B32B 5/16*       (2006.01)
    *B62D 55/08*      (2006.01)
    *C22C 38/00*      (2006.01)

(52) U.S. Cl.
    CPC ............... *B23K 9/23* (2013.01); *B23K 9/324* (2013.01); *B62D 55/12* (2013.01); *B62D 55/21* (2013.01); *C22C 32/00* (2013.01); *B22F 5/08* (2013.01); *B22F 2998/10* (2013.01); *B23K 2101/06* (2018.08); *B23K 2101/30* (2018.08); *B23K 2103/04* (2018.08); *B32B 5/16* (2013.01); *B62D 55/08* (2013.01); *B62D 55/135* (2013.01); *C22C 38/00* (2013.01)

(58) Field of Classification Search
    CPC ...... B23K 9/046; B23K 9/048; B23K 31/025; B23P 6/007
    See application file for complete search history.

(56) References Cited

U.S. PATENT DOCUMENTS

| | | | | |
|---|---|---|---|---|
| 3,071,490 A * | 1/1963 | Pevar | .............. | C23C 4/02 118/620 |
| 3,934,828 A * | 1/1976 | Persson | .............. | B02C 17/225 241/102 |
| 4,042,282 A * | 8/1977 | Haslett | .............. | B60S 1/68 305/108 |
| 4,218,494 A * | 8/1980 | Belmondo | .............. | B22F 7/08 219/121.35 |
| 4,243,727 A * | 1/1981 | Wisler | .............. | C23C 4/06 175/374 |
| 4,682,987 A * | 7/1987 | Brady | .............. | B24D 3/007 427/376.3 |
| 5,547,902 A * | 8/1996 | Rohner | .............. | H01L 21/76838 438/613 |
| 5,852,272 A | 12/1998 | Amano | | |
| 6,414,258 B1 * | 7/2002 | Amano | .............. | B23K 9/046 219/76.14 |
| 6,666,013 B2 * | 12/2003 | Nakagawa | .............. | B21L 9/065 384/45 |
| 6,948,784 B2 * | 9/2005 | Wodrich | .............. | B62D 55/21 29/898.13 |
| 2009/0019783 A1 * | 1/2009 | Amano | .............. | B23K 9/04 51/309 |
| 2010/0229386 A1 | 9/2010 | Scancarello et al. | | |
| 2015/0033561 A1 * | 2/2015 | Bruck | .............. | F01D 5/147 29/889.71 |
| 2015/0377263 A1 * | 12/2015 | Dupuis | .............. | F15B 15/2846 92/5 R |
| 2017/0216950 A1 * | 8/2017 | Ohishi | .............. | B23K 9/04 |
| 2017/0216951 A1 * | 8/2017 | Ohishi | .............. | B23K 9/04 |
| 2017/0216976 A1 * | 8/2017 | Ohishi | .............. | B23K 9/04 |
| 2017/0217516 A1 * | 8/2017 | Ohishi | .............. | B23K 9/04 |
| 2018/0127036 A1 * | 5/2018 | Ohishi | .............. | B62D 55/26 |

FOREIGN PATENT DOCUMENTS

| | | |
|---|---|---|
| JP | H03-23025 A | 1/1991 |
| JP | H05-77042 A | 3/1993 |
| JP | H08-47774 A | 2/1996 |
| JP | 2008-000763 A | 1/2008 |
| JP | 2013-46928 * | 3/2013 |

* cited by examiner

FIG.35
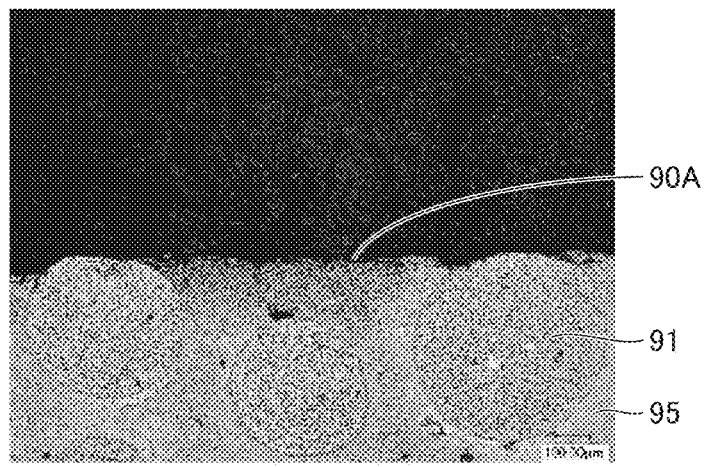
FIG.36 <COMPARATIVE EXAMPLE>
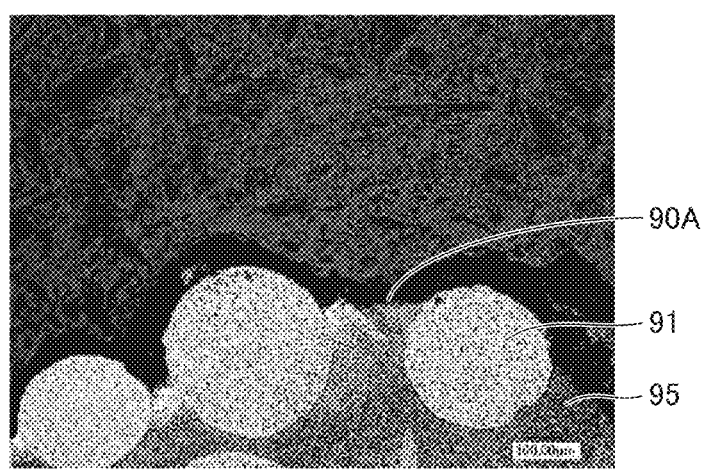
FIG.37
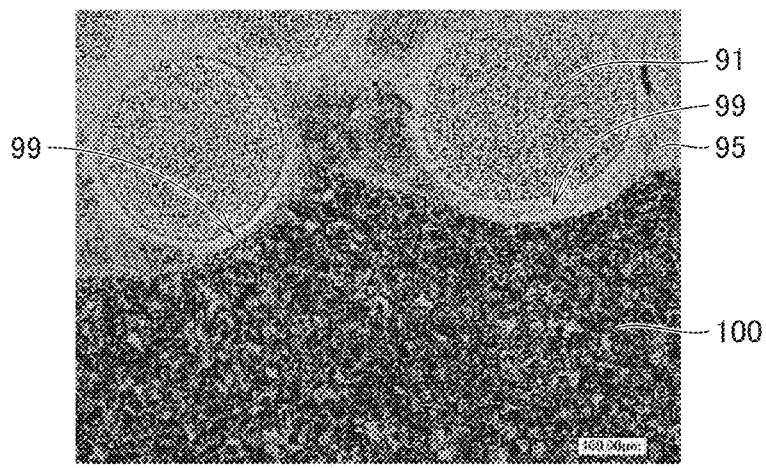

MACHINE COMPONENT AND METHOD FOR PRODUCING THE SAME

CROSS-REFERENCE TO RELATED APPLICATIONS

This application is a National Stage application of PCT Application No. PCT/JP2014/080540 filed Nov. 18, 2014.

TECHNICAL FIELD

The present invention relates to machine components and methods for producing the machine components, and more particularly, to a machine component that includes an overlay having hard particles dispersed in a matrix and a method for producing the machine component.

BACKGROUND ART

On a machine component, an overlay may be formed for improving wear resistance and other purposes. Overlays adoptable for improving the wear resistance include one having hard particles dispersed in a matrix made of steel, for example. Such an overlay can be formed, for example, by overlaying welding (see, for example, Japanese Patent Application Laid-Open No. 2008-763 (Patent Literature 1) and Japanese Patent Application Laid-Open No. H8-47774 (Patent Literature 2)).

CITATION LIST

Patent Literature

Patent Literature 1: Japanese Patent Application Laid-Open No. 2008-763
Patent Literature 2: Japanese Patent Application Laid-Open No. H8-47774

SUMMARY OF INVENTION

Technical Problem

In a machine component with an overlay having hard particles dispersed in a matrix, the hard particles may fall off from the overlay during the use of the machine component. The machine component having such an overlay may suffer deterioration in wear resistance when the hard particles fall off from the overlay.

An object of the present invention is to improve wear resistance of a machine component by preventing the hard particles from falling off from the overlay.

Solution to Problem

A machine component according to the present invention includes: a base made of a first metal; and an overlay disposed in contact with the base to cover at least a part of a surface of the base. The overlay includes a matrix made of a second metal, and hard particles dispersed in the matrix. The overlay has a surface which is a forged surface. The hard particles located in an overlay surface region are arranged side by side while being embedded in the overlay, the overlay surface region being a region within an average particle diameter of the hard particles from the surface of the overlay.

In the machine component of the present invention, the surface of the overlay is a forged surface. The hard particles located in the overlay surface region are arranged side by side while being embedded in the overlay. This prevents the hard particles from protruding noticeably from the surface of the overlay. As a result, the hard particles are prevented from falling off during the use of the machine component, leading to improved wear resistance of the machine component. Thus, according to the machine component of the present invention, it is possible to improve wear resistance of the machine component. It should be noted that the average particle diameter of the hard particles may be obtained by observing a cross section perpendicular to the surface of the overlay with an optical microscope, and by calculating an average of the diameters of ten hard particles observed.

In the machine component described above, the hard particles located in the overlay surface region may be arranged in contact with the surface of the overlay. With this, the region of a hard particle exposed from the surface of the overlay becomes small, which prevents the hard particle from falling off.

In the machine component described above, among the hard particles located in the overlay surface region, any hard particle having a region exposed from the surface of the overlay may have an acute central angle (of less than 90°) corresponding to the region exposed from the surface of the overlay. With this, the region of a hard particle exposed from the surface of the overlay becomes small, which prevents the hard particle from falling off.

In the machine component described above, in a region including an interface between the overlay and the base, the overlay may include a protrusion that protrudes toward the base. This prevents the overlay from coming off the base.

In the machine component described above, the protrusion may have at least a part of the hard particle received therein. This more reliably prevents the overlay from coming off the base.

The machine component described above may be used as a component of a tracked undercarriage, as a bucket tooth, or as a tooth of a crusher. The above machine component, which is excellent in wear resistance, is suitable for these machine components requiring high wear resistance.

A method for producing a machine component according to the present invention includes the steps of: preparing a base member made of a first metal; forming an overlay to cover at least a part of a surface of the base member; and forging the base member having the overlay formed, such that the overlay is worked. The step of forming the overlay includes forming the overlay including a matrix made of a second metal and hard particles dispersed in the matrix.

In the machine component producing method of the present invention, the base member having the overlay formed is forged such that the overlay having the hard particles dispersed in the matrix is worked. When the overlay is worked by forging, the hard particles that were protruding from the surface of the overlay are pressed into the matrix having relatively low hardness. Thus, in the vicinity of the surface of the overlay, the hard particles are sufficiently embedded in the overlay. As a result, the hard particles are prevented from falling off during the use of the machine component, leading to improved wear resistance of the machine component. Thus, according to the machine component producing method of the present invention, it is possible to improve wear resistance of the machine component.

In the machine component producing method described above, the step of forging the base member having the overlay formed may include hot forging the base member having the overlay formed. Hot forging adopted can facilitate forging of the base member with the overlay formed.

In the machine component producing method described above, the machine component may be used as a component of a tracked undercarriage, as a bucket tooth, or as a tooth of a crusher. The above machine component producing method, capable of producing the above machine component excellent in wear resistance, is suitable for producing these machine components requiring high wear resistance.

Effects of Invention

As is clear from the above description, according to the machine component and its producing method of the present invention, it is possible to improve the wear resistance of the machine component by preventing the hard particles from falling off from the overlay.

BRIEF DESCRIPTION OF DRAWINGS

FIG. 35 is an optical micrograph showing a surface and its vicinity of an overlay (Example);

FIG. 36 is an optical micrograph showing a surface and its vicinity of an overlay (Comparative example);

FIG. 37 is an optical micrograph showing an interface between an overlay and a base and its vicinity (Example)

DESCRIPTION OF EMBODIMENTS

Figure 1:
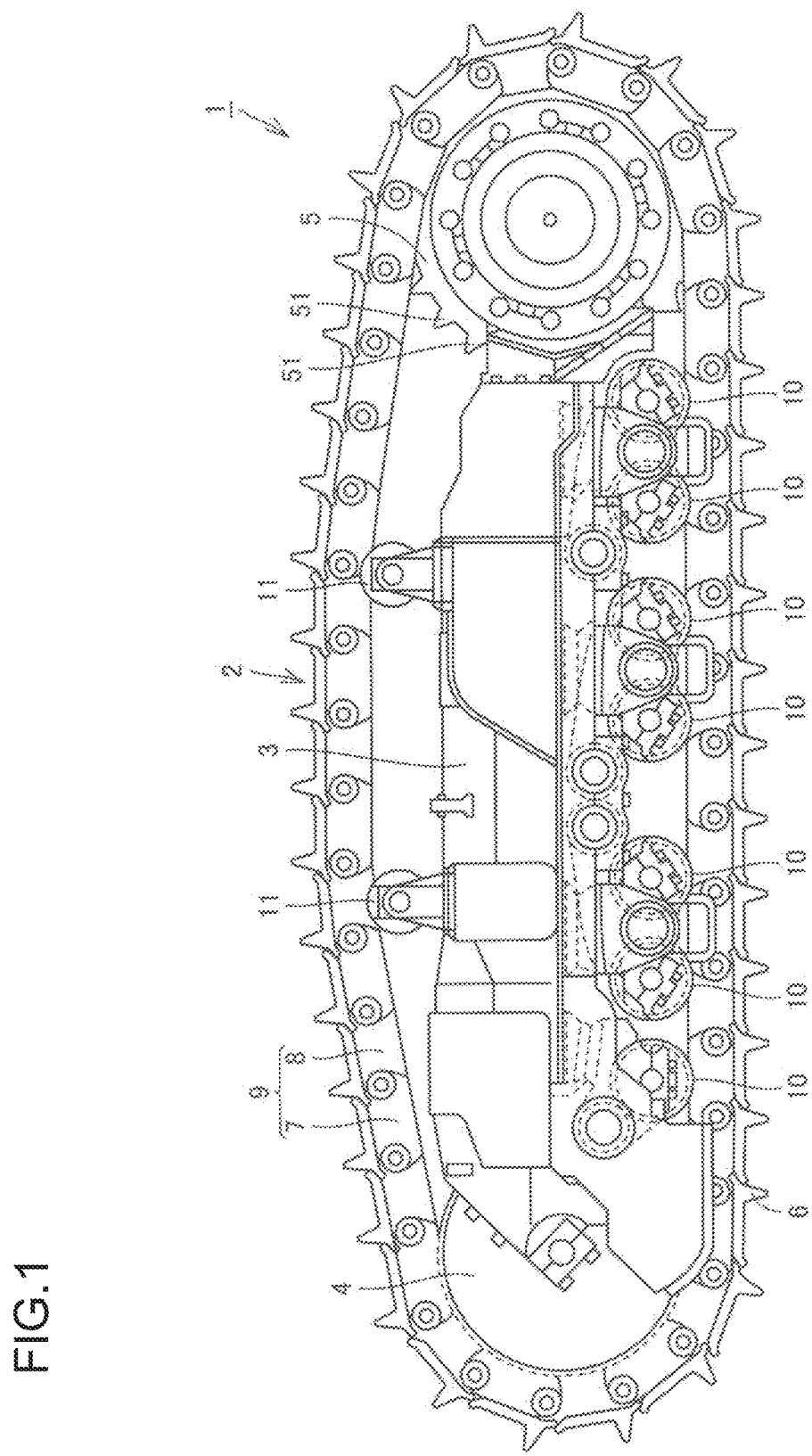
FIG. 1 is a schematic diagram showing the structure of a track travel device.

Embodiments of the present invention will be described below. In the following drawings, the same or corresponding parts are denoted by the same reference numerals, and the description thereof will not be repeated.

First Embodiment

Figure 2:
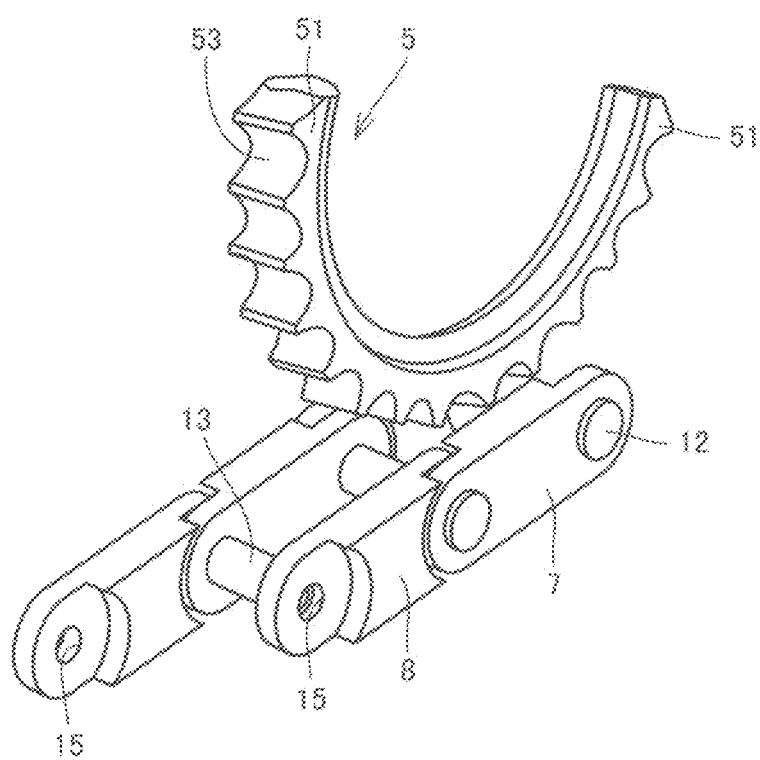
FIG. 2 is a schematic diagram illustrating operations of a sprocket wheel and bushings.
Figure 3:
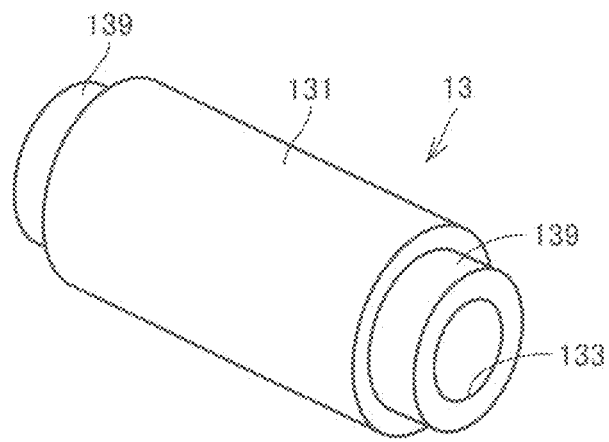
FIG. 3 is a schematic perspective view showing the structure of a bushing.
Figure 4:
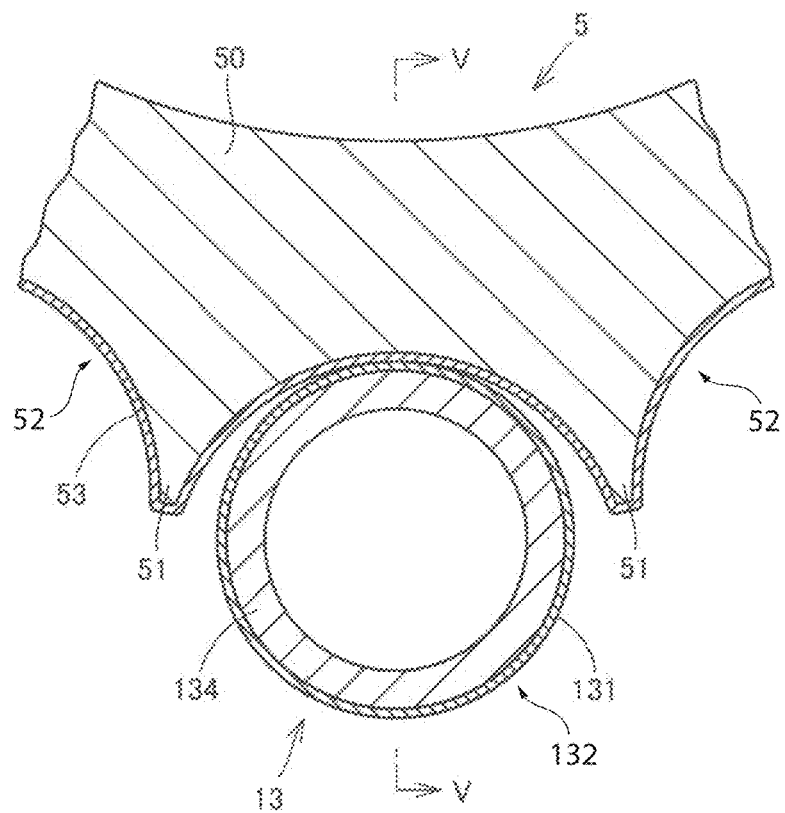
FIG. 4 is a schematic cross-sectional view showing the contact state of the sprocket wheel and a bushing.
Figure 5:
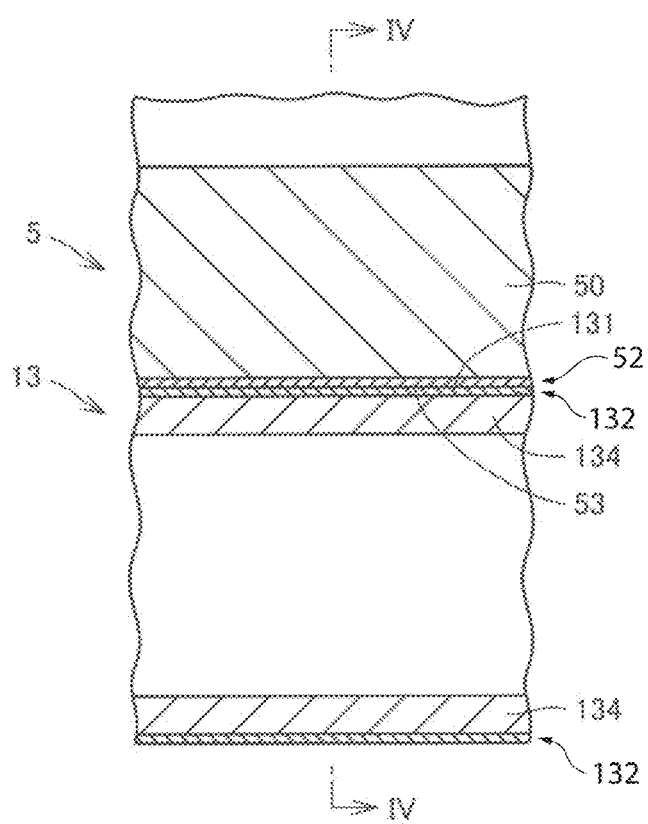
FIG. 5 is a schematic cross-sectional view taken along the line V-V in FIG. 4.

A machine component according to a first embodiment, which is an embodiment of the present invention, will be described taking a sprocket wheel and bushings of a track travel device as examples. FIG. 1 is a schematic diagram showing the structure of a track travel device. FIG. 2 is a schematic diagram illustrating operations of a sprocket wheel and bushings. FIG. 3 is a schematic perspective view showing the structure of a bushing. FIGS. 4 and 5 are schematic cross-sectional views showing the contact state of the sprocket wheel and a bushing.

Referring to FIG. 1, a track travel device 1 in the present embodiment is a travel device for a work machine such as a bulldozer, and includes: a track 2; a track frame 3; an idler tumbler 4; a sprocket wheel 5; a plurality of (here, seven) track rollers 10; and a plurality of (here, two) carrier rollers 11.

The track 2 includes a plurality of track links 9, which are connected endlessly, and track shoes 6, which are fixed to the corresponding track links 9. The track links 9 include outer links 7 and inner links 8. The outer links 7 and the inner links 8 are connected alternately.

The idler tumbler 4, the plurality of track rollers 10, and the plurality of carrier rollers 11 are attached to the track frame 3 in such a manner that they are rotatable about their respective axes. The sprocket wheel 5 is arranged on one end of the track frame 3. A power source such as an engine is connected to the sprocket wheel 5, and the sprocket wheel 5, driven by the power source, rotates about its axis. On an outer peripheral surface of the sprocket wheel 5, a plurality of projections 51 are arranged which project radially outward. The projections 51 mesh with the track 2. The rotation of the sprocket wheel 5 is thus transmitted to the track 2. The track 2, driven by the rotation of the sprocket wheel 5, rotates in a circumferential direction.

The idler tumbler 4 is attached to the other end (opposite to the end where the sprocket wheel 5 is arranged) of the track frame 3. Further, on the track frame 3, in the region sandwiched between the sprocket wheel 5 and the idler tumbler 4, the track rollers 10 and the carrier rollers 11 are attached respectively on the ground contact side and on the side opposite to the ground contact side. The idler tumbler 4, the track rollers 10, and the carrier rollers 11 have their outer peripheral surfaces coming into contact with the inner peripheral surface of the track 2. As a result, the track 2, driven by the rotation of the sprocket wheel 5, rotates in the circumferential direction while being guided by the idler tumbler 4, the sprocket wheel 5, the track rollers 10, and the carrier rollers 11.

Referring to FIG. 2, an outer link 7 and an inner link 8 adjacent to each other are connected by means of a connecting pin 12 and a bushing 13. Each inner link 8 has two through holes 15 formed to penetrate in a direction perpendicular to the plane of rotation of the track 2. One and the other of these two through holes 15 are formed on one end and the other end, respectively, in the longitudinal direction of the link. Each outer link 7 has two through holes 15 formed to penetrate in a direction perpendicular to the plane of rotation of the track 2. One and the other of these two through holes 15 are formed on one end and the other end, respectively, in the longitudinal direction of the link.

Referring to FIG. 3, the bushing 13 has a hollow cylindrical shape. The bushing 13 has a smaller-diameter portion 139, having a smaller outer diameter, formed on each end. The bushing 13 has an inner peripheral surface 133 having a constant diameter over the length. The bushing 13 is reduced in thickness in the smaller-diameter portions 139.

Referring to FIGS. 2 and 3, a pair of outer links 7 are arranged such that their two through holes 15 are aligned respectively as seen from the direction perpendicular to the plane of rotation of the track 2. A pair of inner links 8 are arranged such that their two through holes 15 are aligned respectively as seen from the direction perpendicular to the plane of rotation of the track 2. An outer link 7 and an inner link 8 adjacent to each other are arranged such that one through hole 15 of the outer link 7 and one through hole 15 of the inner link 8 are aligned as seen from the direction perpendicular to the plane of rotation of the track 2. A bushing 13 is arranged such that it is sandwiched between a pair of inner links 8 and such that the smaller-diameter portion 139 on each end is inserted into a through hole 15 of the corresponding inner link 8. A connecting pin 12 is arranged to penetrate through the through holes 15 of the neighboring outer and inner links 7 and 8, the holes being aligned as seen from the direction perpendicular to the plane of rotation of the track 2, and through the space surrounded by the inner peripheral surface 133 of the corresponding bushing 13. The connecting pin 12 is arranged to penetrate through the bushing 13 in the longitudinal direction.

The sprocket wheel 5 rotates in a circumferential direction, with its outer peripheral surface 53 meshing with outer peripheral surfaces 131 of the bushings 13 constituting the track 2. The outer peripheral surface 53 of the sprocket wheel 5 and the outer peripheral surface 131 of each bushing 13 are thus required to have high wear resistance. The sprocket wheel 5 is a machine component that slides relative to another component, or, the bushing 13, while being in contact with the bushing 13 in the contact region, or, the outer peripheral surface 53. The bushing 13 is a machine component that slides relative to another component, or, the sprocket wheel 5, while being in contact with the sprocket wheel 5 in the contact region, or, the outer peripheral surface 131.

Referring to FIGS. 4 and 5, the sprocket wheel 5 includes a base 50, made of a metal (steel), and an overlay 52 which covers the base 50 so as to form the outer peripheral surface 53, which is the contact region. The outer peripheral surface 53 which is the surface of the overlay 52 has been smoothed. Here, the state in which the outer peripheral surface 53, i.e. the surface of the overlay 52, is smoothed refers to the state in which surface profile affected by surface tension and the like at the time of formation of the overlay 52 in the liquid state has been eliminated from the surface of the overlay 52. In the present embodiment, the outer peripheral surface 53, which is the surface of the overlay 52, is a forged surface. The outer peripheral surface 53, or, the surface of the overlay 52 affected by surface tension and the like during formation of the overlay 52 in the liquid state, has been smoothed by forging. For the metal forming the base 50, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted.

A bushing 13 includes a base 134, and an overlay 132 which covers the base 134 so as to form the outer peripheral surface 131, which is the contact region. The outer peripheral surface 131 which is the surface of the overlay 132 has been smoothed. In the present embodiment, the outer peripheral surface 131, which is the surface of the overlay 132, is a forged surface. The outer peripheral surface 131, or, the surface of the overlay 132 affected by surface tension and the like during formation of the overlay 52 in the liquid state, has been smoothed by forging. For the metal forming the base 134, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted.

In the sprocket wheel 5 and the bushings 13 which are the machine components in the present embodiment, the surfaces of the overlays 52 and 132, which become the contact regions, have been smoothed. This prevents a local increase in contact pressure and other phenomena, making the components less damaging to the other components (bushings 13 and sprocket wheel 5).

Figure 6:
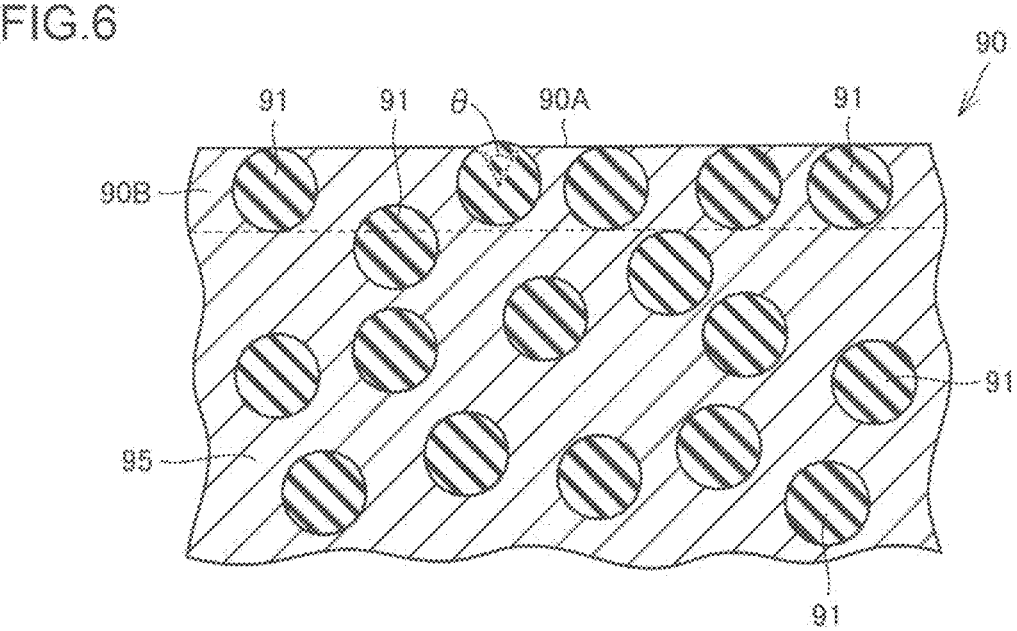
FIG. 6 is a schematic cross-sectional view showing the structure of an overlay at and near its surface.
Figure 7:
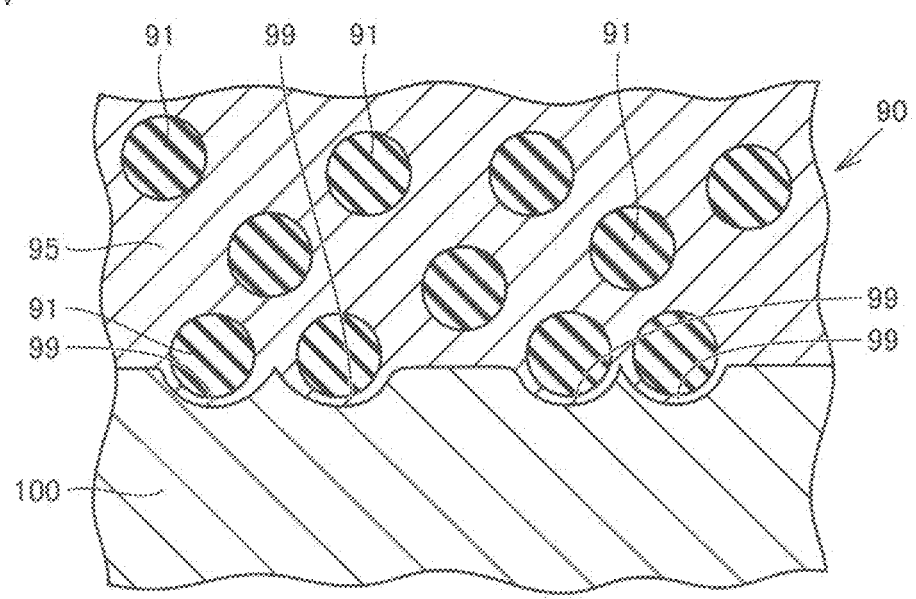
FIG. 7 is a schematic cross-sectional view showing the structure at and around an interface between the overlay and a base.

A description will now be made about the structure of an overlay formed on the sprocket wheel 5 and the bushings 13. FIG. 6 is a schematic cross-sectional view showing the structure of an overlay at and near its surface. FIG. 7 is a schematic cross-sectional view showing the structure at and around an interface between the overlay and a base. Referring to FIGS. 6 and 7, an overlay 90 (overlay 52 and overlay 132) formed on the sprocket wheel 5 and the bushings 13 includes a matrix 95 made of a second metal, and hard particles 91 dispersed in the matrix 95. The second metal forming the matrix 95 can be, for example, a mixture of a metal derived from a welding wire and the metal (first metal) forming a base 100 (base 50 and base 134). As the hard particles 91, particles having higher hardness than the matrix 95, for example particles of cemented carbide, can be adopted. The overlay 90 has higher wear resistance than the base 100.

Referring to FIG. 6, the surface 90A of the overlay 90 is a forged surface. The hard particles 91 located in an overlay surface region 90B, which is a region within an average particle diameter of the hard particles 91 from the surface 90A of the overlay 90, are arranged side by side while being embedded in the overlay 90. This prevents the hard particles 91 from being arranged protruding noticeably from the surface 90A of the overlay 90. This consequently prevents the hard particles 91 from falling off during the use of the sprocket wheel 5 and the bushings 13, leading to improved wear resistance of the sprocket wheel 5 and the bushings 13.

The hard particles 91 located in the overlay surface region 90B may be arranged in contact with the surface 90A of the overlay 90, as shown in FIG. 6. With this, the region of a hard particle 91 exposed from the surface 90A of the overlay 90 becomes small, which prevents the hard particle 91 from falling off.

As shown in FIG. 6, among the hard particles 91 located in the overlay surface region 90B, any hard particle 91 having a region exposed from the surface 90A of the overlay 90 may have an acute central angle $\theta$ (of less than 90°) corresponding to that exposed region. With this, the region of a hard particle 91 exposed from the surface 90A of the overlay 90 becomes small, which prevents the hard particle 91 from falling off.

Referring to FIG. 7, in a region including an interface between the overlay 90 and the base 100, the overlay 90 includes protrusions 99 that protrude toward the base 100. The protrusions 99 provide an anchor effect to prevent the overlay 90 from coming off the base 100. A protrusion 99 receives at least a part of a hard particle 91. This more reliably prevents the overlay 90 from coming off the base 100. There exists the matrix 95 of the overlay 90 between the base 100 and the hard particle 91 received in the protrusion 99. The hard particle 91 received in the protrusion 99 is not in contact with the base 100. The hard particle 91 has its center located outside the protrusion 99 (i.e., a part of the hard particle 91 having a volume less than a half thereof is received in the protrusion 99). One hard particle 91 is received in one protrusion 99. Each protrusion 99 has a depth that is smaller than the radius of the hard particle 91 received in the protrusion 99.

Figure 8:
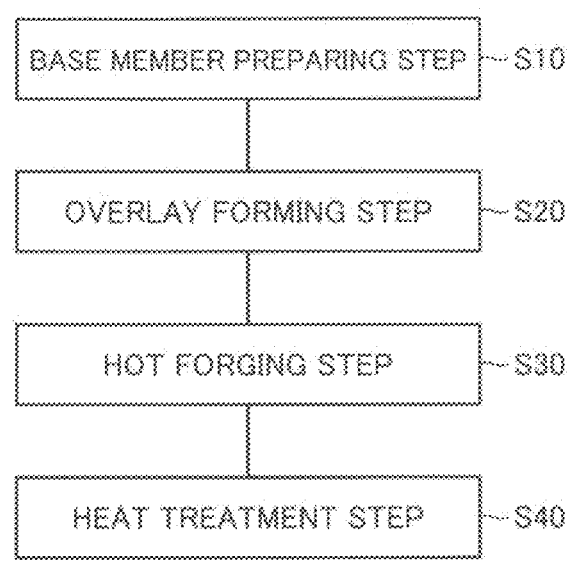
FIG. 8 is a flowchart schematically illustrating a method for producing a machine component.
Figure 9:
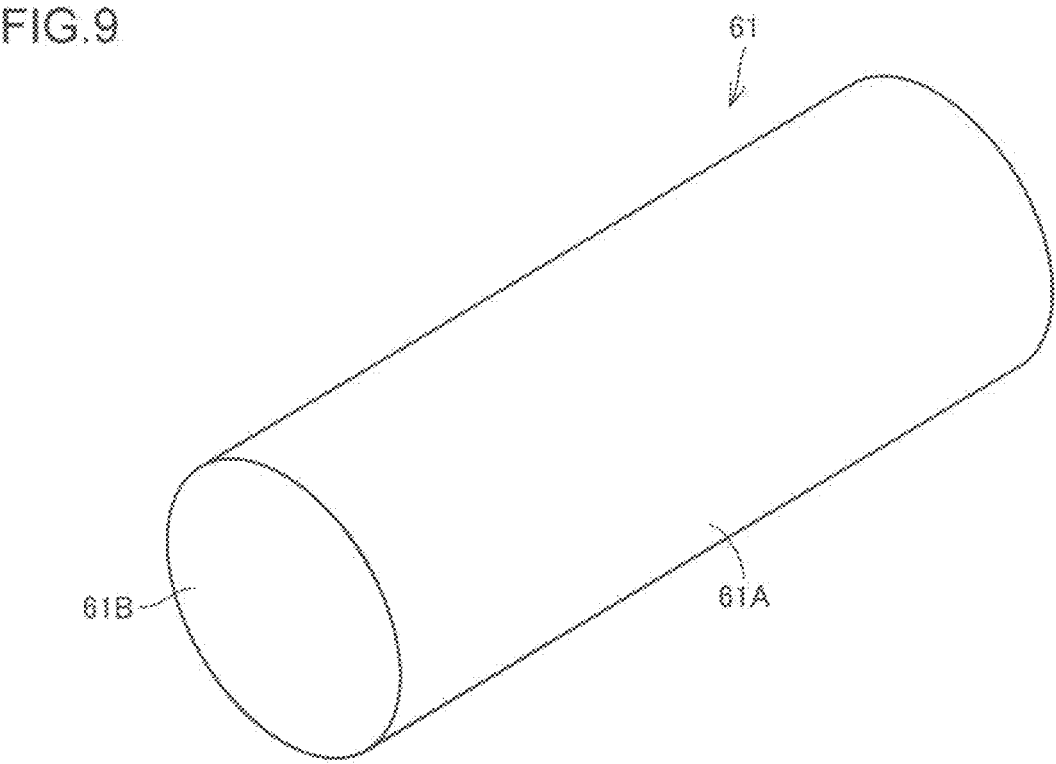
FIG. 9 is a schematic perspective view illustrating a method for producing a sprocket wheel.
Figure 10:
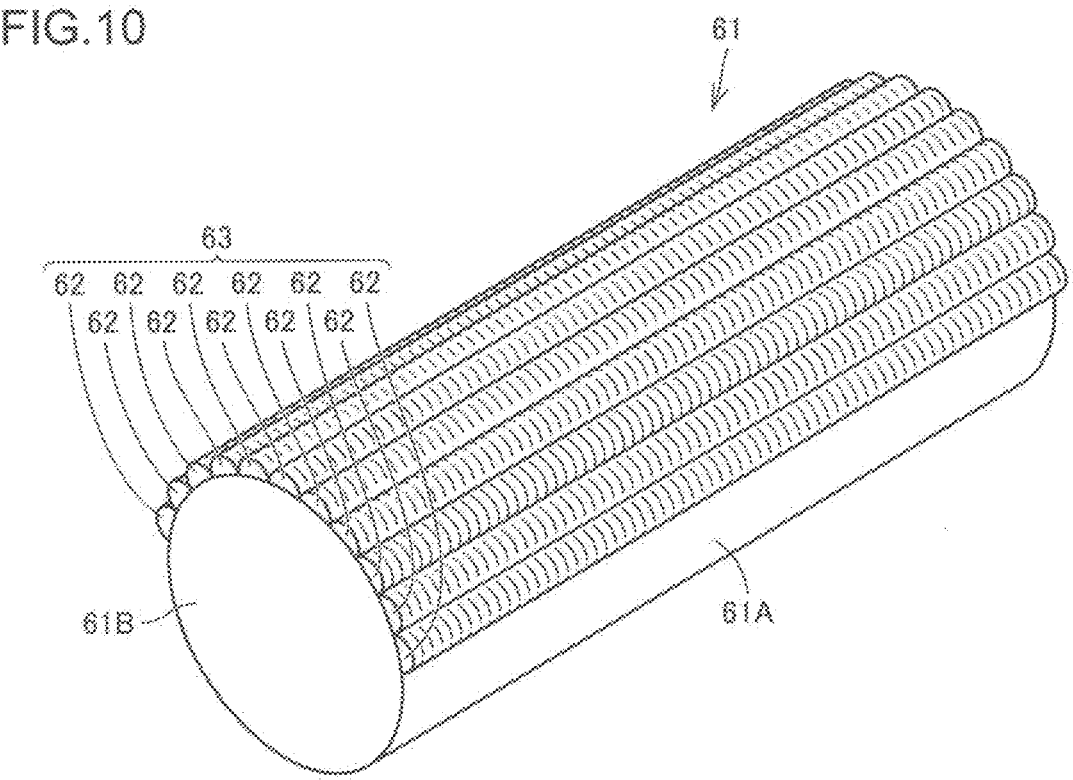
FIG. 10 is a schematic perspective view illustrating the method for producing the sprocket wheel.
Figure 11:
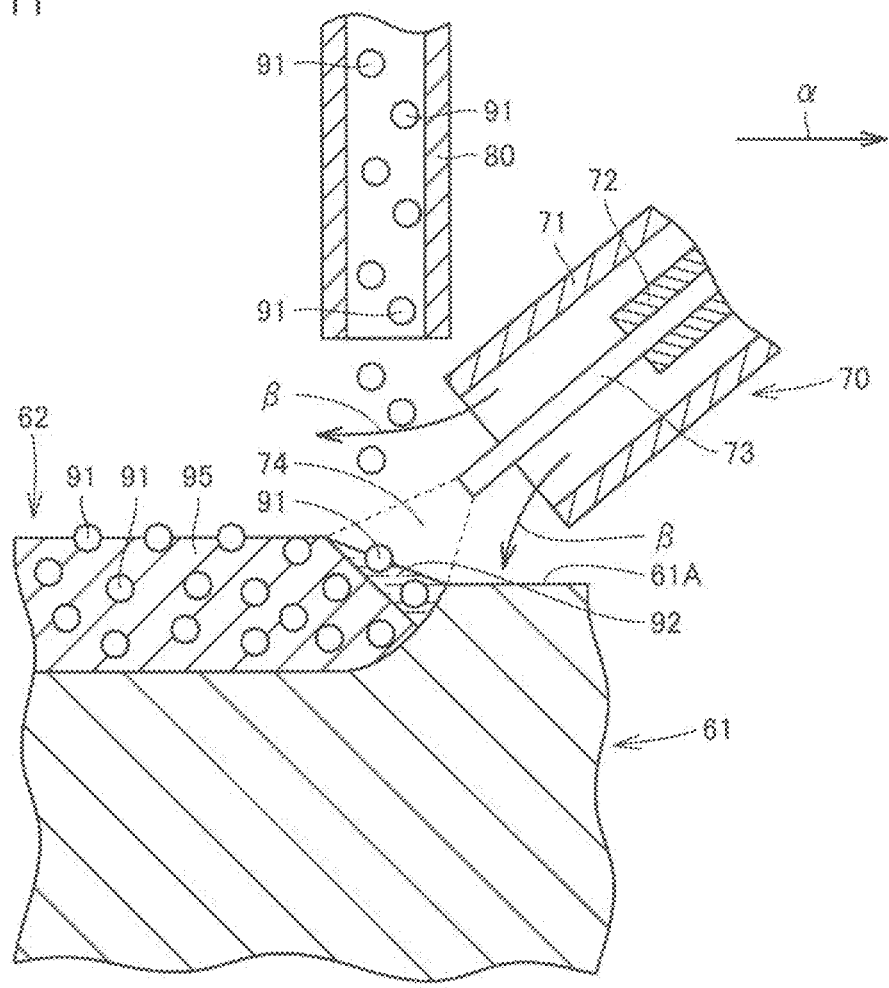
FIG. 11 is a schematic cross-sectional view illustrating a method for forming an overlay.

A method for producing a sprocket wheel 5, which is the machine component in the present embodiment, will now be described with reference to FIGS. 8 to 13. FIG. 8 is a flowchart schematically illustrating a method for producing a sprocket wheel which is the machine component. FIGS. 9, 10, 12, and 13 are schematic perspective views illustrating the method for producing the sprocket wheel. FIG. 11 is a schematic cross-sectional view illustrating a method for forming an overlay.

Referring to FIG. 8, in the method for producing a sprocket wheel 5 in the present embodiment, first, a base member preparing step is carried out as a step S10. In this step S10, referring to FIG. 9, a base member 61, which is to be a base 50 of the sprocket wheel 5, is prepared. The base member 61 is made of a metal forming the base 50. The base member 61 is of a cylindrical shape. The base member 61 includes a pair of end faces 61B and a side face 61A connecting the end faces 61B.

Next, an overlay forming step is carried out as a step S20. In this step S20, referring to FIGS. 9 and 10, an overlay 63 is formed to cover a part of the side face 61A of the base member 61 prepared in the step S10. The overlay 63 is formed over the entire area in the longitudinal direction of the base member 61. The overlay 63 is formed in a part in the circumferential direction (over approximately a half in the circumferential direction) of the base member 61. The overlay 63 has a structure in which beads 62, extending in the longitudinal direction of the base member 61, are laid side by side in the circumferential direction, with no gaps therebetween.

The overlay 63 may be formed by, for example, overlaying welding using $CO_2$ arc welding as described below. First, an overlay forming device will be described. Referring to FIG. 11, the overlay forming device includes a welding torch 70 and a hard particles supplying nozzle 80. The welding torch 70 includes a welding nozzle 71 having a hollow cylindrical shape, and a contact tip 72 disposed inside the welding nozzle 71 and connected to a power source (not shown). A welding wire 73, while being in contact with the contact tip 72, is supplied continuously to the tip end side of the welding nozzle 71. For the welding wire, JIS YGW12, for example, can be adopted. A gap between the welding nozzle 71 and the contact tip 72 is a flow path of shielding gas. The shielding gas flowing through the flow path is discharged from the tip end of the welding nozzle 71. The hard particles supplying nozzle 80 has a hollow cylindrical shape. Inside the hard particles supplying nozzle 80, hard particles 91 are supplied, which are discharged from the tip end of the hard particles supplying nozzle 80.

This overlay forming device can be used to form an overlay 63 through the following procedure. With a base member 61 as one electrode and the welding wire 73 as another electrode, voltage is applied across the base member 61 and the welding wire 73. This generates an arc 74 between the welding wire 73 and the base member 61. The arc 74 is shielded from the ambient air by the shielding gas discharged from the tip end of the welding nozzle 71 along the arrows $\beta$. For the shielding gas, carbon dioxide, for example, can be adopted. The heat in the arc 74 melts a part of the base member 61 and also melts the tip end of the welding wire 73. The tip end of the welding wire 73 thus molten forms droplets, which transfer to the molten region of the base member 61. This forms a molten pool 92 which is a liquid region where the molten base member 61 and the molten welding wire 73 are mixed together. The hard particles 91 discharged from the hard particles supplying nozzle 80 are supplied to this molten pool 92.

As the welding torch 70 and the hard particles supplying nozzle 80 constituting the overlaying welding device move relatively in the direction shown by the arrow $\alpha$ with respect to the base member 61, the position where the molten pool 92 is formed move accordingly. The molten pool 92 previously formed solidifies, resulting in a bead 62. The bead 62 includes a matrix 95 formed by solidification of the molten pool 92, and hard particles 91 dispersed in the matrix 95. A plurality of such beads 62 are formed next to one another in the width direction, with no gaps therebetween, to cover a desired region on the side face 61A of the base member 61, whereby formation of the overlay 63 is completed (see FIG. 10). It should be noted that overlaying welding may be carried out, for example, under the following conditions: welding current of 230 A, welding voltage of 17 V, hard particles feed rate of 110 g/min, and excess bead height of 4 mm. For the welding wire, JIS YGW11 may be adopted. For the hard particles, WC- or $W_2C$-based particles may be adopted.

Figure 12:
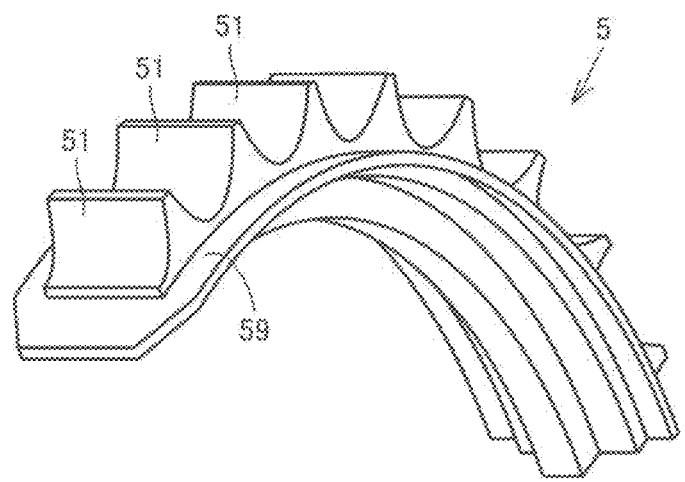
FIG. 12 is a schematic perspective view illustrating the method for producing the sprocket wheel.
Figure 13:
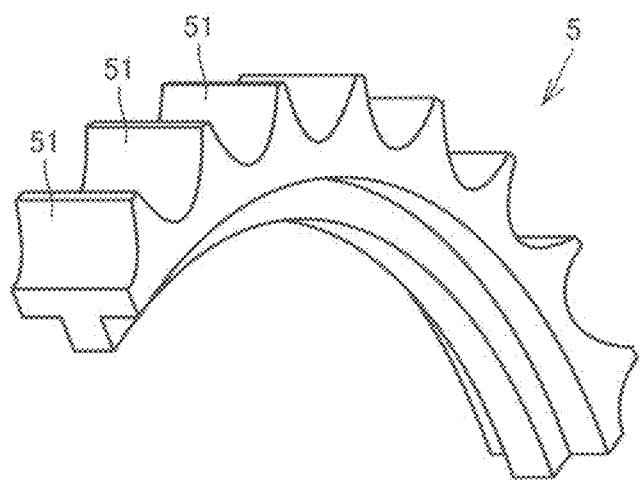
FIG. 13 is a schematic perspective view illustrating the method for producing the sprocket wheel.

Next, a hot forging step is carried out as a step S30. In this step S30, the base member 61 with the overlay 63 formed in the step S20 is hot forged. Referring to FIGS. 10 and 12, the base member 61 with the overlay 63 formed is heated to a temperature enabling hot forging, and then placed in a die having a cavity corresponding to a desired shape of the sprocket wheel 5, for forging. In the present embodiment, a plurality of arc-shaped parts, constituting an annular sprocket wheel 5, are produced by hot forging. The resultant parts are assembled in a later step, to obtain the annular sprocket wheel 5. With hot forging, the overlay 63 formed in the step S20 is worked. The base member 61 is hot forged such that the overlay 63 covers the outer peripheral surface of the sprocket wheel 5. In this manner, an overlay 52 having a smooth surface, from which surface profile affected by surface tension in the liquid state and the like has been eliminated, is obtained. As a result of hot forging, burr 59 is formed, as shown in FIG. 12. Thereafter, referring to FIGS. 12 and 13, die-cutting is carried out to remove the burr 59, whereby a part constituting the sprocket wheel 5 is obtained (see FIG. 13).

Referring to FIGS. 11 and 6, as the base member 61 having the overlay 63 formed is hot forged, hard particles 91 that were protruding from a surface of the overlay 63 (beads 62) during formation of the overlay 63 are pressed into the overlay 63 (beads 62). As a result, in the sprocket wheel 5, the hard particles 91 located in the overlay surface region 90B are arranged side by side while being embedded in the overlay 90. The hard particles 91 located in the overlay surface region 90B are arranged in contact with the surface 90A of the overlay 90. Among the hard particles 91 located in the overlay surface region 90B, any hard particle 91 having a region exposed from the surface 90A of the overlay 90 has an acute central angle θ (of less than 90°) corresponding to the exposed region. This prevents the hard particle 91 from falling off during the use of the sprocket wheel 5, leading to improved wear resistance of the sprocket wheel 5.

Referring to FIGS. 11 and 7, as the base member 61 having the overlay 63 formed is hot forged, protrusions 99 are formed in the overlay 90 in consequence of the hard particles 91 that were located in the vicinity of the interface between the overlay 63 (beads 62) and the base member 61 at the time of formation of the overlay 63 (beads 62). In a protrusion 99, at least a part of a corresponding hard particle 91 is received. The above process simultaneously forms the surface region of the overlay 90 which is excellent in wear resistance with the hard particles 91 arranged in contact with the surface 90A, and the protrusions 99 which prevent the overlay 90 from coming off the base 100.

Referring to FIG. 8, next, a heat treatment step is carried out as a step S40. In this step S40, the sprocket wheel 5 (the part constituting the sprocket wheel 5) obtained through hot forging in the step S30 is subjected to heat treatment. The heat treatment carried out in the step S40 is, for example, quenching and tempering. This imparts desired hardness and toughness to the base 50 of the sprocket wheel 5. Thereafter, in order to make it possible to mount the sprocket wheel 5 on a support body (not shown), a region where no overlay 90 has been formed is subjected to machining for the purposes of improving dimensional accuracy, forming a mounting hole, and so on. The sprocket wheel 5 (the part constituting the sprocket wheel 5) in the present embodiment is thus completed.

Figure 14:
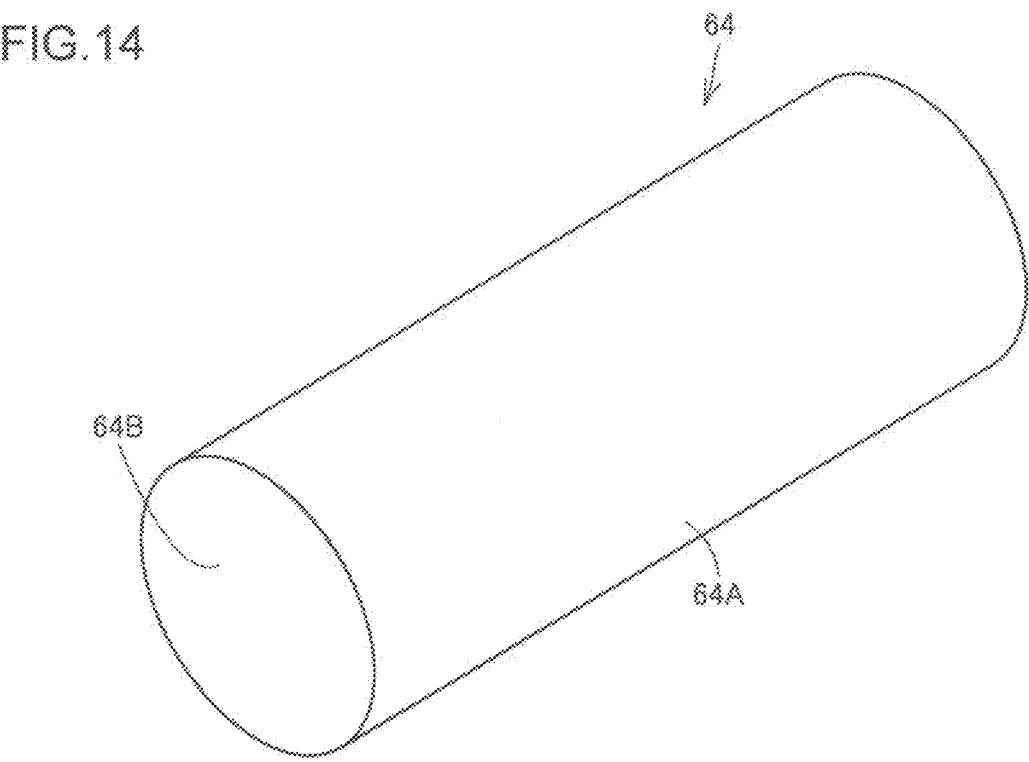
FIG. 14 is a schematic perspective view illustrating a method for producing a bushing.
Figure 15:
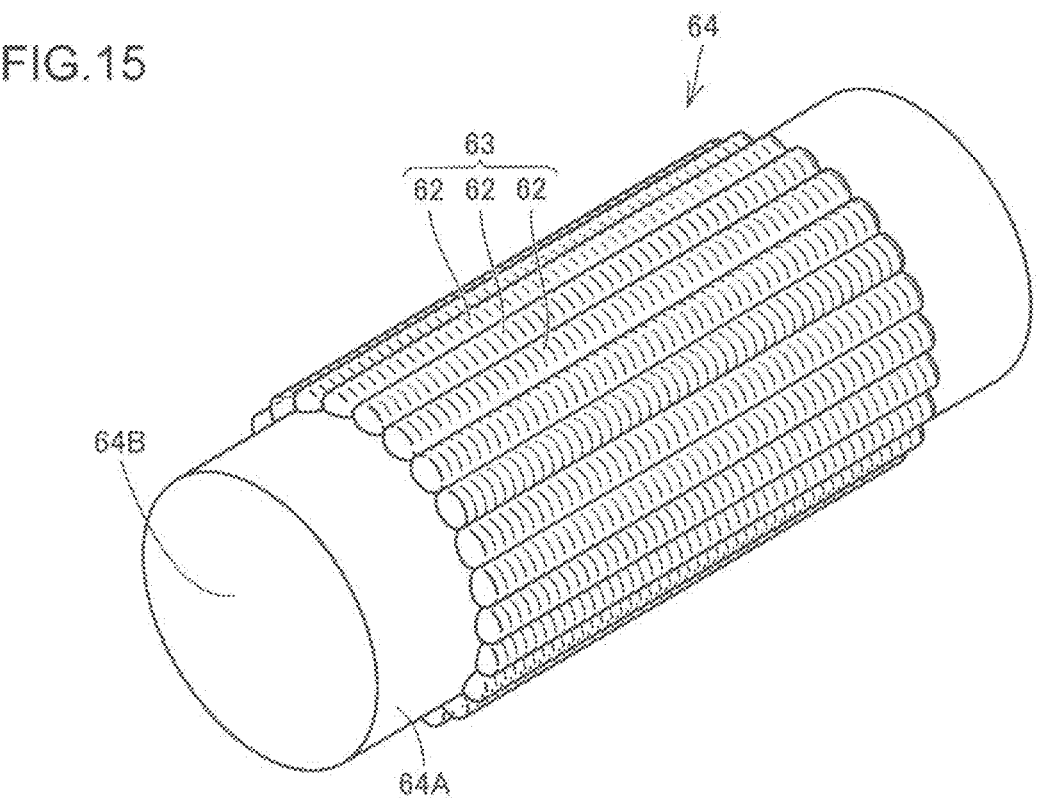
FIG. 15 is a schematic perspective view illustrating the method for producing the bushing.

A method for producing a bushing 13, which is the machine component in the present embodiment, will now be described with reference to FIGS. 8, 14, and 15. FIG. 8 is a flowchart schematically illustrating a method for producing a bushing. FIGS. 14 and 15 are schematic perspective views illustrating the method for producing the bushing. The bushing 13 in the present embodiment can be produced through a similar procedure as the sprocket wheel 5 described above.

Referring to FIG. 8, in the method for producing a bushing 13 in the present embodiment, first, a base member preparing step is carried out as a step S10. In this step S10, referring to FIG. 14, a base member 64, which is to be a base 134 of the bushing 13, is prepared. The base member 64 is made of a metal forming the base 134. The base member 64 is of a cylindrical shape. The base member 64 includes a pair of end faces 64B and an outer peripheral surface 64A connecting the end faces 61B.

Next, an overlay forming step is carried out as a step S20. In this step S20, referring to FIGS. 14 and 15, an overlay 63 is formed to cover a part of the outer peripheral surface 64A of the base member 61 prepared in the step S10. The overlay 63 is formed in the central portion in the longitudinal direction of the base member 64. No overlay 63 is formed in both end portions in the longitudinal direction of the base member 64. The overlay 63 is formed over the entire area in the circumferential direction of the base member 64. The overlay 63 has a structure in which beads 62, extending in the longitudinal direction of the base member 64, are laid side by side in the circumferential direction, with no gaps therebetween. The overlay 63 can be formed by, for example, overlaying welding using $CO_2$ arc welding, as in the case of producing the sprocket wheel 5 described above. It should be noted that the overlay 63 may be formed in a part in the circumferential direction of the base member 64, for example over a half of the circumference, corresponding to the region that is to come into contact with the sprocket wheel 5.

Next, a hot forging step is carried out as a step S30. In this step S30, the base member 64 with the overlay 63 formed in the step S20 is hot forged. Referring to FIG. 15 and FIGS. 3 to 5, the base member 64 with the overlay 63 formed is heated to a temperature enabling hot forging, and then placed in a die having a cavity corresponding to a desired shape of the bushing 13, for forging. With hot forging, the overlay 63 formed in the step S20 is worked. The base member 64 is hot forged such that the overlay 63 covers the outer peripheral surface 131 of the bushing 13. In this manner, an overlay 132 having a smooth surface, from which surface profile affected by surface tension in the liquid state and the like has been eliminated, is obtained. The both ends in the longitudinal direction of the base member 64, where no overlay 63 has been formed, become the smaller-diameter portions 139 of the bushing 13. Thereafter, a pin hole is formed to which a connecting pin 12 is to be inserted for connection of the links 7 and 8 (see FIG. 2). Referring to FIG. 3, the pin hole is defined by the inner peripheral surface 133 and extends in the axial direction.

As the base member 64 having the overlay 63 formed is hot forged, hard particles 91 that were protruding from a surface of the overlay 63 (beads 62) during formation of the overlay 63 (beads 62) are pressed into the overlay 63 (beads 62). As a result, in the bushing 13, the hard particles 91 located in the overlay surface region 90B are arranged side by side while being embedded in the overlay 90. The hard particles 91 located in the overlay surface region 90B are arranged in contact with the surface 90A of the overlay 90. Among the hard particles 91 located in the overlay surface region 90B, any hard particle 91 having a region exposed from the surface 90A of the overlay 90 has an acute central angle θ (of less than 90°) corresponding to the exposed region. This prevents the hard particle 91 from falling off during the use of the bushing 13, leading to improved wear resistance of the bushing 13.

As the base member 64 having the overlay 63 formed is hot forged, in the bushing 13, protrusions 99 are formed in the overlay 90 in consequence of the hard particles 91 that were located in the vicinity of the interface between the overlay 63 (beads 62) and the base member 64 at the time of formation of the overlay 63 (beads 62). In a protrusion 99, at least a part of a corresponding hard particle 91 is received.

Referring to FIG. 8, next, a heat treatment step is carried out as a step S40. In this step S40, the bushing 13 obtained through hot forging in the step S30 is subjected to heat treatment. The heat treatment carried out in the step S40 is, for example, quenching and tempering. This imparts desired hardness and toughness to the base 134 of the bushing 13. Thereafter, the smaller-diameter portions 139 of the bushing 13 are subjected to machining for the purposes of improving dimensional accuracy, reducing surface roughness, and so on. The bushing 13 in the present embodiment is thus completed.

Second Embodiment

Figure 16:
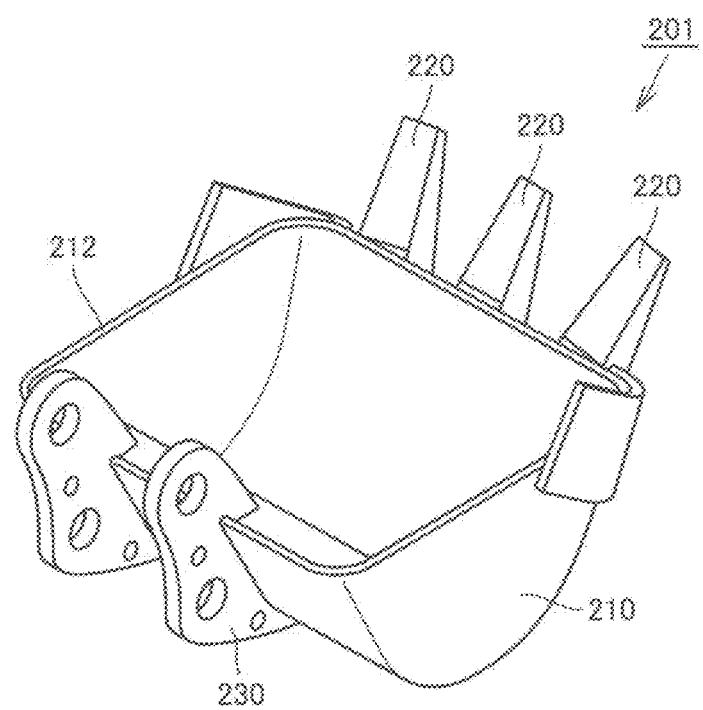
FIG. 16 is a schematic perspective view showing the structure of a bucket of a hydraulic excavator.
Figure 17:
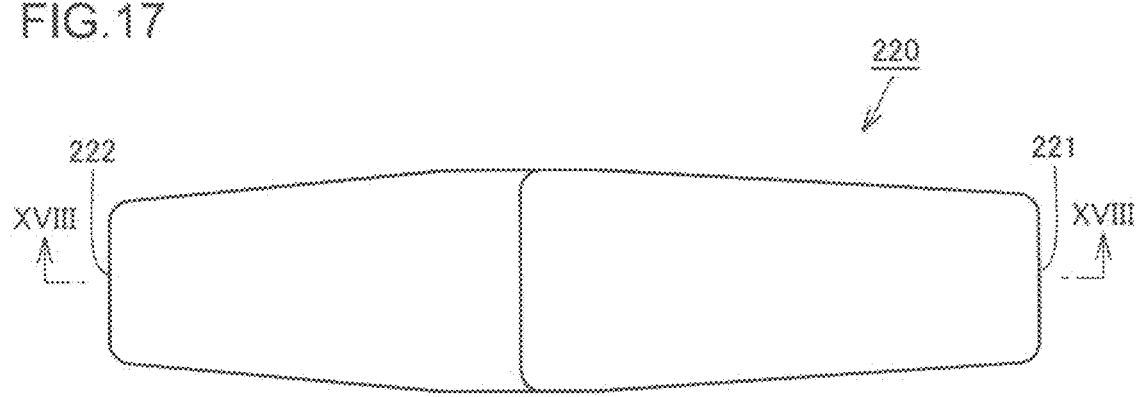
FIG. 17 is a schematic plan view showing the structure of a tooth.
Figure 18:
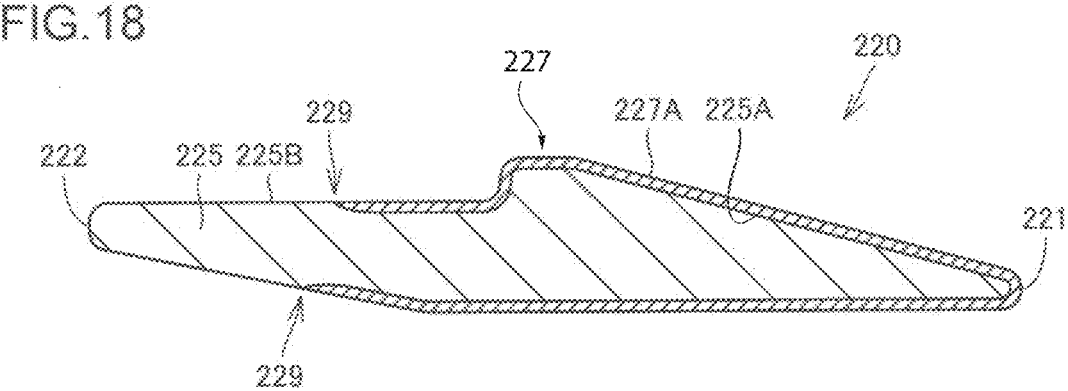
FIG. 18 is a schematic cross-sectional view taken along the line XVIII-XVIII in FIG. 17.

A machine component according to a second embodiment, which is another embodiment of the present invention, will now be described taking a bucket tooth of a hydraulic excavator as an example. FIG. 16 is a schematic perspective view showing the structure of a bucket of a hydraulic excavator. FIG. 17 is a schematic plan view showing the structure of a tooth. FIG. 18 is a schematic cross-sectional view taken along the line XVIII-XVIII in FIG. 17.

Referring to FIG. 16, a bucket 201 in the present embodiment, which is attached to a tip end of an arm (not shown) of a hydraulic excavator, is for excavating earth and sand. The bucket 201 includes: a main body 210, made up of a plate-like member and having an opening; a plurality of (in the bucket 201 shown in FIG. 16, three) teeth 220 attached to the main body 210 to partially protrude from a periphery 212 of the opening of the main body 210 on its excavating side; and a mounting portion 230 disposed on a side of the main body 210 opposite to the side where the teeth 220 are attached. The bucket 201 is supported by the arm of the hydraulic excavator via the mounting portion 230. When the bucket 201 is used for excavation, the teeth 220 enter into earth and sand first. The teeth 220 are thus required to have high earth and sand abrasion resistance (wear resistance).

A tooth 220 includes a tip end 221 and a proximal end 222, as shown in FIG. 17. The tooth 220 is attached to the main body 210 at its proximal end 222 side, with its tip end 221 side protruding from the periphery 212 of the opening of the bucket 201. The tooth 220 is used while being in contact with another component which is the main body 210. The bucket 201 enters into earth and sand from the tip end 221 side of the tooth 220. The tip end 221 side of the tooth 220 thus requires particularly high earth and sand abrasion resistance.

Referring to FIG. 18, a tooth 220 includes a base 225 made of a first metal, and an overlay 227 disposed in contact with the base 225 to cover a covered region 225A that is a part of a surface of the base 225. As the first metal for the base 225, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted. In an overlay edge portion 229 corresponding to a boundary between the covered region 225A and an exposed region 225B that is a region other than the covered region 225A on the surface of the base 225, the exposed region 225B and a surface 227A of the overlay 227 are flush with each other to form a forged surface. The surface 227A of the overlay 227 is entirely the forged surface.

Figure 19:
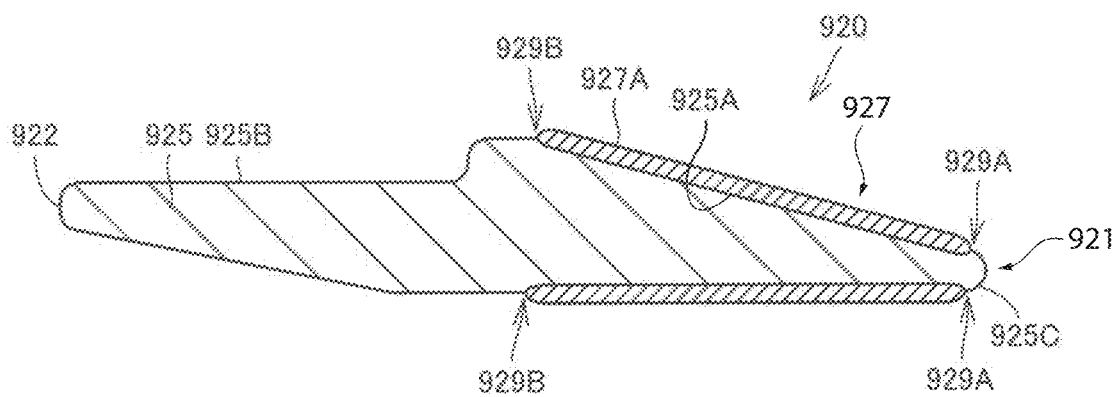
FIG. 19 is a schematic cross-sectional view showing the structure of a tooth of a Comparative example.

FIG. 19 is a schematic cross-sectional view showing the structure of a tooth with an overlay, as a Comparative example. In the case of forming an overlay for improving wear resistance at and near a tip end of a tooth, it is common to form the overlay on a steel base having a desired shape. Referring to FIG. 19, the tooth 920 of the Comparative example, which is a typical tooth having an overlay, includes a tip end 921 and a proximal end 922. An overlay 927 is formed on the tip end 921 side of the tooth 920. The overlay 927 is formed by overlaying welding, for example, to cover a covered region 925A of a base 925 that has been shaped into a desired shape. Thus, in overlay edge portions 929A, 929B corresponding to boundaries between the covered region 925A and exposed regions 925B, 925C other than the covered region 925A, steps are formed between the exposed regions 925B, 925C and a surface 927A of the overlay 927. Such steps increase penetration resistance of the tooth 920 in earth and sand. Further, the overlay 927 is formed after the base 925 is shaped. It is difficult to form the overlay 927 in the vicinity of the tip end 921. Thus, in the region including the tip end 921, the tip-end exposed region 925C is formed which is uncovered with the overlay 927. This tip-end exposed region 925C having low wear resistance accelerates the progress of wear and increases the replacement frequency of the tooth 920.

Referring to FIG. 18, according to the tooth 220 in the present embodiment, the exposed region 225B and the surface 227A of the overlay 227 are flush with each other in the overlay edge portion 229. This can prevent an increase in penetration resistance otherwise caused by a step in the overlay edge portion 229. With the overlay edge portion 229 included in the forged surface, the working step such as cutting for making the exposed region 225B and the surface 227A of the overlay 227 flush with each other can be omitted. Consequently, the working on the overlay edge portion 229 where the difference in hardness is great and the working on the overlay 227 which is high in hardness can be avoided. Thus, according to the tooth 220 in the present embodiment, it is possible to prevent a disadvantage that would otherwise be caused by forming the overlay 227. Further, an overlay may be formed on a base member and then forging may be performed to shape a region including the tip end 221. By doing so, the region including the tip end 221 can readily be covered with the overlay 227, as shown in FIG. 18, and a tooth 220 having high wear resistance can be obtained.

Referring to FIGS. 6 and 7, the overlay 90 (overlay 227) formed on the tooth 220 includes, as in the case of the sprocket wheel 5 and the bushing 13 in the first embodiment described above, a matrix 95 made of a second metal, and hard particles 91 dispersed in the matrix 95. The second metal forming the matrix 95 can be, for example, a mixture of a metal derived from a welding wire and a metal (first metal) forming the base 100 (base 225). As the hard particles 91, particles having higher hardness than the matrix 95, for example particles of cemented carbide, can be adopted. The overlay 90 has higher earth and sand abrasion resistance (wear resistance) than the base 100.

Referring to FIG. 6, the surface 90A of the overlay 90 is a forged surface. The hard particles 91 located in an overlay surface region 90B, which is a region within an average particle diameter of the hard particles 91 from the surface 90A of the overlay 90, are arranged side by side while being embedded in the overlay 90. This prevents the hard particles 91 from being arranged protruding noticeably from the surface 90A of the overlay 90. This consequently prevents the hard particles 91 from falling off during the use of the tooth 220, leading to improved wear resistance of the tooth 220.

The hard particles 91 located in the overlay surface region 90B may be arranged in contact with the surface 90A of the overlay 90, as shown in FIG. 6. With this, the region of a hard particle 91 exposed from the surface 90A of the overlay 90 becomes small, which prevents the hard particle 91 from falling off.

As shown in FIG. 6, among the hard particles 91 located in the overlay surface region 90B, any hard particle 91 having a region exposed from the surface 90A of the overlay 90 may have an acute central angle θ (of less than 90°) corresponding to that exposed region. With this, the region of a hard particle 91 exposed from the surface 90A of the overlay 90 becomes small, which prevents the hard particle 91 from falling off.

Referring to FIG. 7, the overlay 90 includes protrusions 99 that protrude toward the base 100 in a region including an interface between the overlay 90 and the base 100. The protrusions 99 provide an anchor effect to prevent the overlay 90 from coming off the base 100. A protrusion 99 receives at least a part of a hard particle 91. This more reliably prevents the overlay 90 from coming off the base 100. There exists the matrix 95 of the overlay 90 between the base 100 and the hard particle 91 received in the protrusion 99. The hard particle 91 received in the protrusion 99 is not in contact with the base 100. The hard particle 91 has its center located outside the protrusion 99 (i.e., a part of the hard particle 91 having a volume less than a half thereof is received in the protrusion 99). One hard particle 91 is received in one protrusion 99. Each protrusion 99 has a depth that is smaller than the radius of the hard particle 91 received in the protrusion 99.

Figure 20:
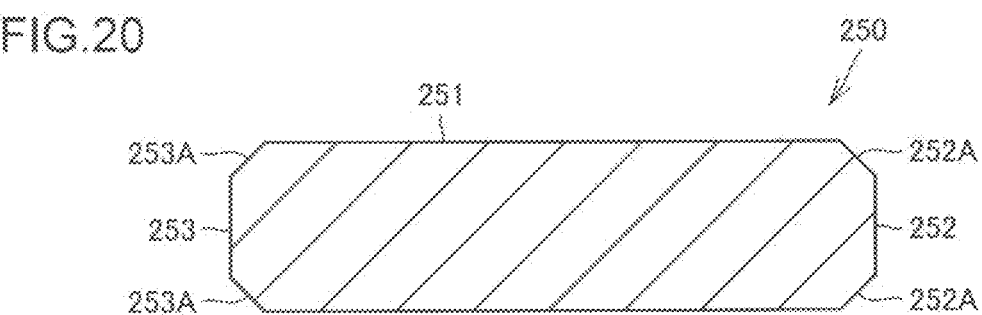
FIG. 20 is a schematic cross-sectional view illustrating a method for producing a tooth.
Figure 21:
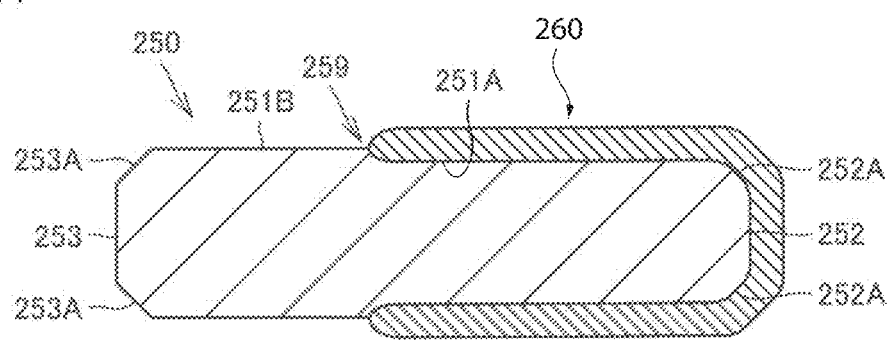
FIG. 21 is a schematic cross-sectional view illustrating the method for producing the tooth.

A method for producing a tooth 220 will now be described. FIG. 8 is a flowchart schematically illustrating a method for producing a tooth, which is the machine component. FIGS. 20 and 21 are schematic cross-sectional views illustrating the method for producing the tooth.

Referring to FIG. 8, in the method for producing a tooth 220 in the present embodiment, first, a base member preparing step is carried out as a step S10. In this step S10, referring to FIG. 20, a base member 250, which is to be a base 225 of the tooth 220, is prepared. The base member 250 is made of a first metal. The base member 250 is of a cylindrical shape. The base member 250 has a cylindrical shape including one end face 252, another end face 253, and a side face 251 connecting the one end face 252 and the other end face 253. A first chamfered portion 252A is formed in a region where the one end face 252 and the side face 251 are connected. A second chamfered portion 253A is formed in a region where the other end face 253 and the side face 251 are connected. Referring to FIGS. 20 and 18, the one end face 252 side of the base member 250 corresponds to the tip end 221 side of the tooth 220, and the other end face 253 side of the base member 250 corresponds to the proximal end 222 side of the tooth 220.

Next, an overlay forming step is carried out as a step S20. In this step S20, referring to FIGS. 20 and 21, an overlay 260 is formed in contact with a covered region 251A that is a part of a surface of the base member 250 prepared in the step S10, to cover the covered region 251A. The overlay 260 is formed such that it will cover a desired region of the base 225 when hot forging is carried out, which will be described later. The covered region 251A can be determined in advance through a simulation of hot forging using a finite element method, for example. In the present embodiment, referring to FIG. 21, the overlay 260 is formed to cover the one end face 252 side of the side face 251, the first chamfered portion 252A, and the one end face 252. The overlay 260 can be formed by overlaying welding using $CO_2$ arc welding, as in the case of the first embodiment described above.

Next, a hot forging step is carried out as a step S30. In this step S30, the base member 250 with the overlay 260 formed in the step S20 is hot forged. Referring to FIGS. 21 and 18, the base member 250 with the overlay 260 formed is heated to a temperature enabling hot forging, and then placed in a die having a cavity corresponding to a desired shape of the tooth 220, for forging. With this hot forging, a region of the base member 250 including an overlay edge portion 259 is worked. As a result of hot forging, the overlay edge portion 259 becomes the overlay edge portion 229 of the tooth 220. With the overlay edge portion 259 worked in hot forging, the tooth 220 is obtained which has the exposed region 225B and the surface 227A of the overlay 227 flush with each other in the overlay edge portion 229. In the overlay edge portion 229, the exposed region 225B and the surface 227A of the overlay 227 form a flush, forged surface corresponding to the region of the surface of the die used in the hot forging where the overlay edge portion 259 is worked. In the overlay edge portion 229, the exposed region 225B and the surface 227A of the overlay 227 form a flush surface corresponding to the shape of the die for forging. The overlay edge portion 229 is included in the forged surface.

As the base member 250 having the overlay 260 formed is hot forged, hard particles 91 that were protruding from a surface of the overlay 260 during formation of the overlay 260 are pressed into the overlay 260. As a result, in the tooth 220, the hard particles 91 located in the overlay surface region 90B are arranged side by side while being embedded in the overlay 90. The hard particles 91 located in the overlay surface region 90B are arranged in contact with the surface 90A of the overlay 90. Among the hard particles 91 located in the overlay surface region 90B, any hard particle 91 having a region exposed from the surface 90A of the overlay 90 has an acute central angle θ (of less than 90°) corresponding to the exposed region (see FIG. 6). This prevents the hard particle 91 from falling off during the use of the tooth 220, leading to improved wear resistance of the tooth 220.

As the base member 250 having the overlay 260 formed is hot forged, in the tooth 220, protrusions 99 are formed in the overlay 90 in consequence of the hard particles 91 that were located in the vicinity of the interface between the overlay 260 and the base member 250 at the time of formation of the overlay 260. In a protrusion 99, at least a part of a corresponding hard particle 91 is received (see FIG. 7).

Referring to FIG. 8, next, a heat treatment step is carried out as a step S40. In this step S40, the tooth 220 obtained through hot forging in the step S30 is subjected to heat treatment. The heat treatment carried out in the step S40 is, for example, quenching and tempering. This imparts desired hardness and toughness to the base 225 of the tooth 220. Through the above procedure, the tooth 220 in the present embodiment is completed.

Third Embodiment

Figure 22:
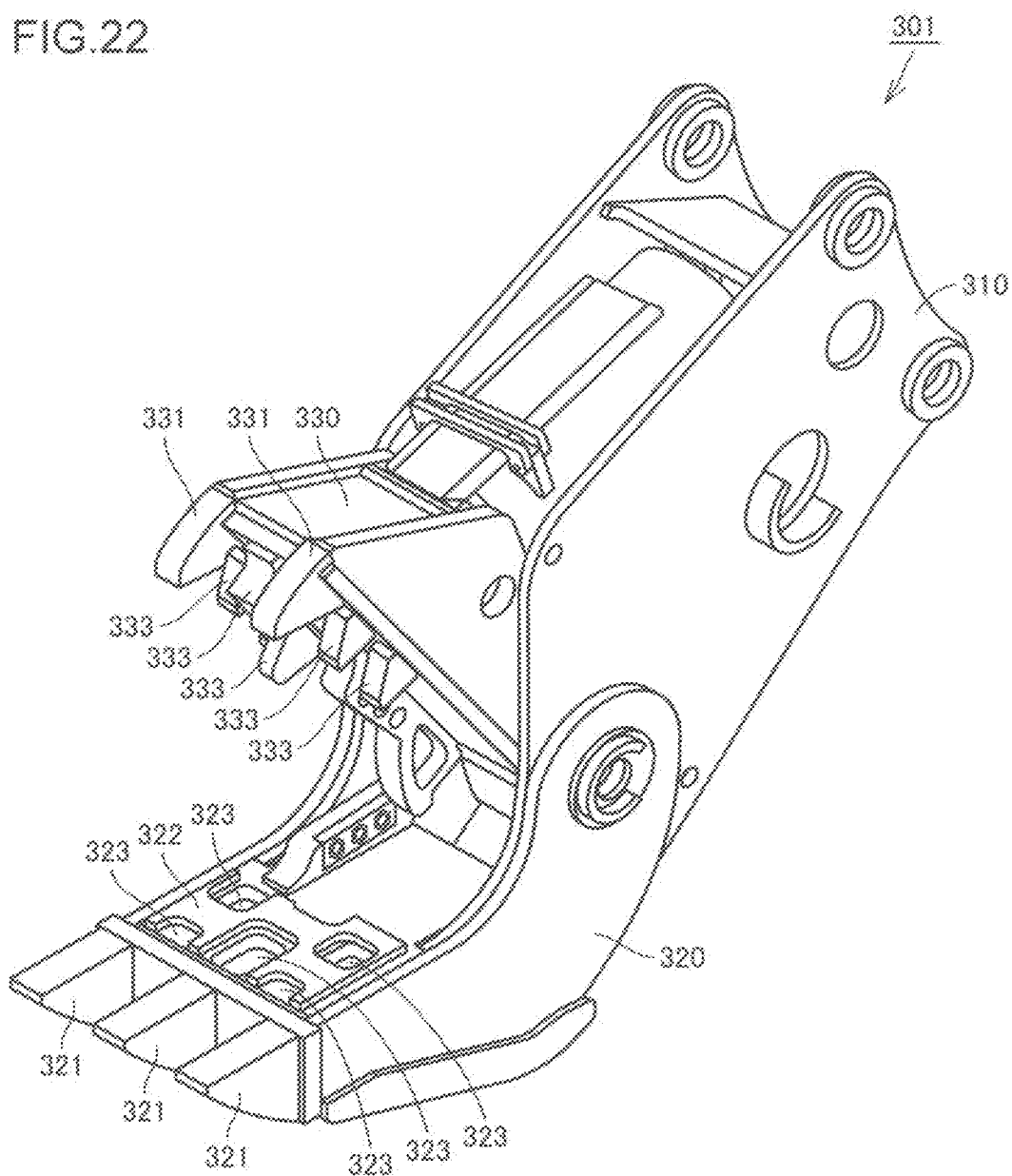
FIG. 22 is a schematic perspective view showing the structure of a crusher.
Figure 23:
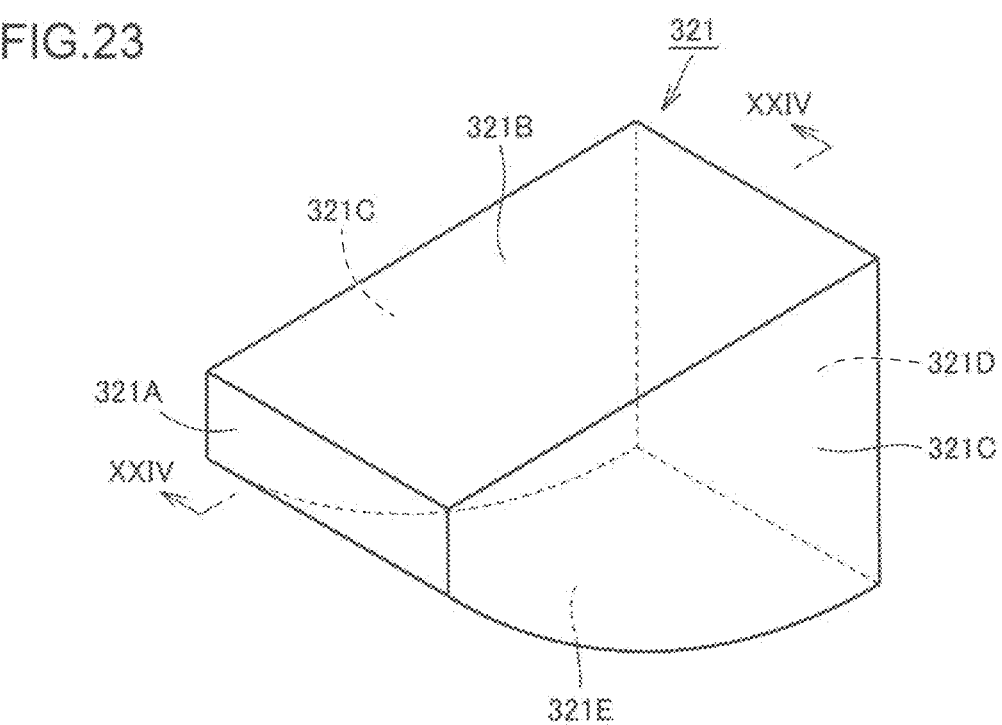
FIG. 23 is a schematic perspective view showing the structure of a stationary-section external tooth of the crusher.
Figure 24:
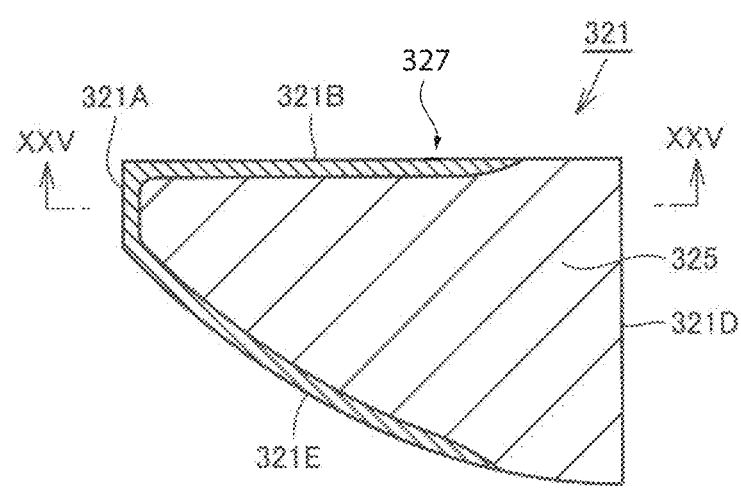
FIG. 24 is a schematic cross-sectional view taken along the line XXIV-XXIV in FIG. 23.
Figure 25:
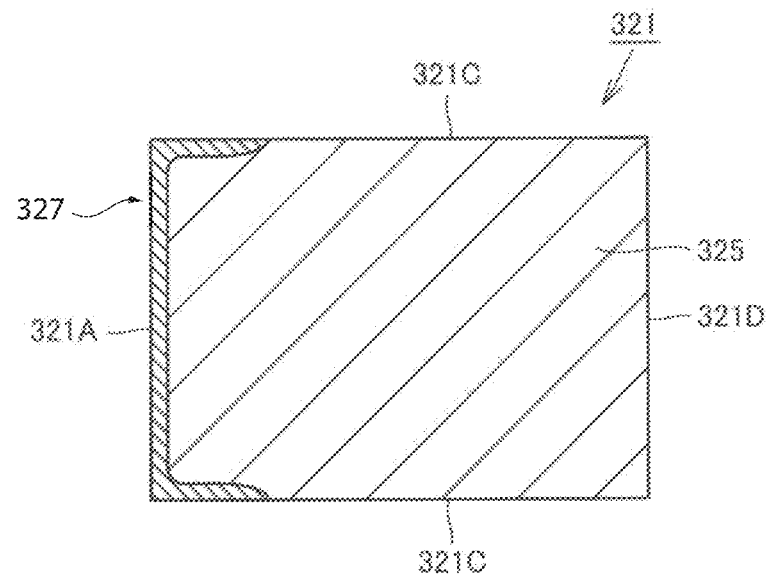
FIG. 25 is a schematic cross-sectional view taken along the line XXV-XXV in FIG. 24.

A machine component according to a third embodiment, which is another embodiment of the present invention, will now be described taking a tooth of a crusher as an example. FIG. 22 is a schematic perspective view showing the structure of a crusher. FIG. 23 is a schematic perspective view showing the structure of a stationary-section external tooth of the crusher. FIG. 24 is a schematic cross-sectional view taken along the line XXIV-XXIV in FIG. 23. FIG. 25 is a schematic cross-sectional view taken along the line XXV-XXV in FIG. 24.

Referring to FIG. 22, a crusher 301 in the present embodiment, which is attached to a tip end of an arm of a work machine, is for crushing concrete or other materials to be crushed. The crusher 301 includes a main frame 310, a stationary section 320 fixed to the main frame 310, and a movable section 330 turnably attached to the main frame 310 such that it can be opened and closed with respect to the stationary section 320. The movable section 330 is connected to a hydraulic cylinder (not shown) disposed in the main frame 310. The movable section 330, driven by the hydraulic cylinder, turns to be opened and closed with respect to the stationary section 320.

The stationary section 320 has a tip end on which a plurality of (in the present embodiment, three) stationary-section external teeth 321 are attached spaced apart from each other. In the stationary section 320, a crusher plate 322 is placed on the region that opposes the movable section 330 when the movable section 330 is closed with respect to the stationary section 320. The crusher plate 322 has a plurality of through holes formed, and recesses 323 are formed in the regions of the stationary section 320 exposed from the respective through holes. The movable section 330 has a tip end on which a plurality of (in the present embodiment, two) movable-section external teeth 331 are attached spaced apart from each other. In the movable section 330, a plurality of movable-section internal teeth 333 are disposed in the region that opposes the stationary section 320 when the movable section 330 is closed with respect to the stationary section 320. When the movable section 330 is closed with respect to the stationary section 320, the two movable-section external teeth 331 respectively enter the two spaces formed by the three stationary-section external teeth 321. When the movable section 330 is closed with respect to the stationary section 320, the movable-section internal teeth 333 enter the corresponding recesses 323 in the stationary section 320. With the crusher 301 having such a structure, concrete or other materials to be crushed are fed between the movable section 330 and the stationary section 320 in the state where the movable section 330 is open with respect to the stationary section 320, and the movable section 330 is then closed with respect to the stationary section 320, whereby the materials are crushed. When the materials are being crushed, the stationary-section external teeth 321, the movable-section external teeth 331, and the movable-section internal teeth 333 directly come into contact with the concrete or other materials to be crushed. The stationary-section external teeth 321, the movable-section external teeth 331, and the movable-section internal teeth 333, which are the teeth of the crusher, are thus required to have high wear resistance. For improving the wear resistance, overlays can be formed on the teeth of the crusher, or, the stationary-section external teeth 321, the movable-section external teeth 331, and the movable-section internal teeth 333. Hereinafter, the structure of a stationary-section external tooth 321, as an example of the tooth of the crusher, will be described.

Referring to FIG. 23, a stationary-section external tooth 321 has: a tip end face 321A which is a flat surface on the tip end side; a proximal end face 321D which is a flat surface on the proximal end side; a first side face 321B which is a flat surface connecting the tip end face 321A and the proximal end face 321D and supposed to face the movable section 330 side; a second side face 321E which is a curved surface connecting the tip end face 321A and the proximal end face 321D and located opposite to the first side face 321B; and two third side faces 321C each of which is a flat surface connecting the tip end face 321A and the proximal end face 321D and also connecting the first side face 321B and the second side face 321E. The stationary-section external tooth 321 is attached to the stationary section 320 at the proximal end face 321D.

Referring to FIGS. 24 and 25, the stationary-section external tooth 321 includes a base 325 made of a first metal, and an overlay 327 disposed in contact with the base 325 so as to cover a part of the surface of the base 325. The overlay 327 covers the entire area of the tip end face 321A, and a part of each of the first side face 321B, the second side face 321E, and the third side faces 321C. The first side face 321B and the second side face 321E have greater proportions of their surfaces covered by the overlay 327 as compared to the third side faces 321C. No overlay 327 is formed on the proximal end face 321D. For the first metal forming the base 325, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted.

Referring to FIGS. 6 and 7, the overlay 90 (overlay 327) formed on the stationary-section external tooth 321 includes a matrix 95 made of a second metal, and hard particles 91 dispersed in the matrix 95, as in the case of the sprocket wheel 5 and the bushings 13 in the first embodiment described above. The second metal forming the matrix 95 can be, for example, a mixture of a metal derived from a welding wire and the metal (first metal) forming the base 100 (base 325). As the hard particles 91, particles having higher hardness than the matrix 95, for example particles of cemented carbide, can be adopted. The overlay 90 has higher wear resistance than the base 100.

Referring to FIG. 6, the surface 90A of the overlay 90 is a forged surface. The hard particles 91 located in an overlay surface region 90B, which is a region within an average particle diameter of the hard particles 91 from the surface 90A of the overlay 90, are arranged side by side while being embedded in the overlay 90. This prevents the hard particles 91 from being arranged protruding noticeably from the surface 90A of the overlay 90. This consequently prevents the hard particles 91 from falling off during the use of the stationary-section external tooth 321, leading to improved wear resistance of the stationary-section external tooth 321.

The hard particles 91 located in the overlay surface region 90B may be arranged in contact with the surface 90A of the overlay 90, as shown in FIG. 6. With this, the region of a hard particle 91 exposed from the surface 90A of the overlay 90 becomes small, which prevents the hard particle 91 from falling off.

As shown in FIG. 6, among the hard particles 91 located in the overlay surface region 90B, any hard particle 91 having a region exposed from the surface 90A of the overlay 90 may have an acute central angle θ (of less than 90°) corresponding to that exposed region. With this, the region of a hard particle 91 exposed from the surface 90A of the overlay 90 becomes small, which prevents the hard particle 91 from falling off.

Referring to FIG. 7, in a region including an interface between the overlay 90 and the base 100, the overlay 90 includes protrusions 99 that protrude toward the base 100. The protrusions 99 provide an anchor effect to prevent the overlay 90 from coming off the base 100. A protrusion 99 receives at least a part of a hard particle 91. This more reliably prevents the overlay 90 from coming off the base 100. There exists the matrix 95 of the overlay 90 between the base 100 and the hard particle 91 received in the protrusion 99. The hard particle 91 received in the protrusion 99 is not in contact with the base 100. The hard particle 91 has its center located outside the protrusion 99 (i.e., a part of the hard particle 91 having a volume less than a half thereof is received in the protrusion 99). One hard particle 91 is received in one protrusion 99. Each protrusion 99 has a depth that is smaller than the radius of the hard particle 91 received in the protrusion 99.

Figure 26:
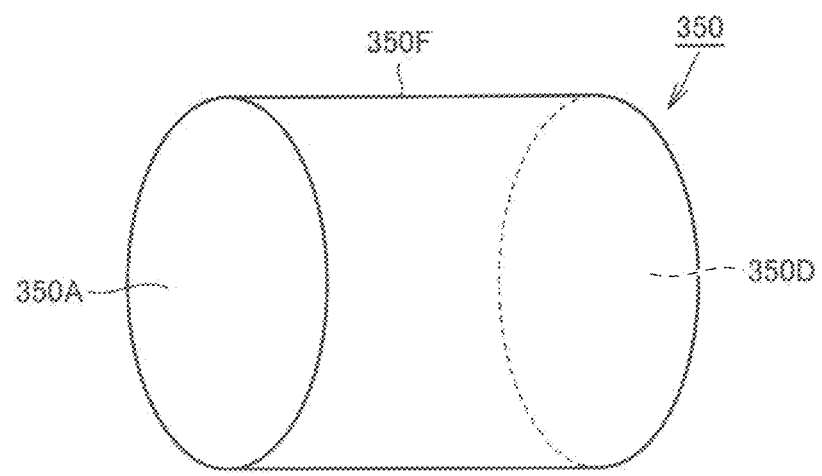
FIG. 26 is a schematic perspective view illustrating a method for producing a stationary-section external tooth of a crusher.
Figure 27:
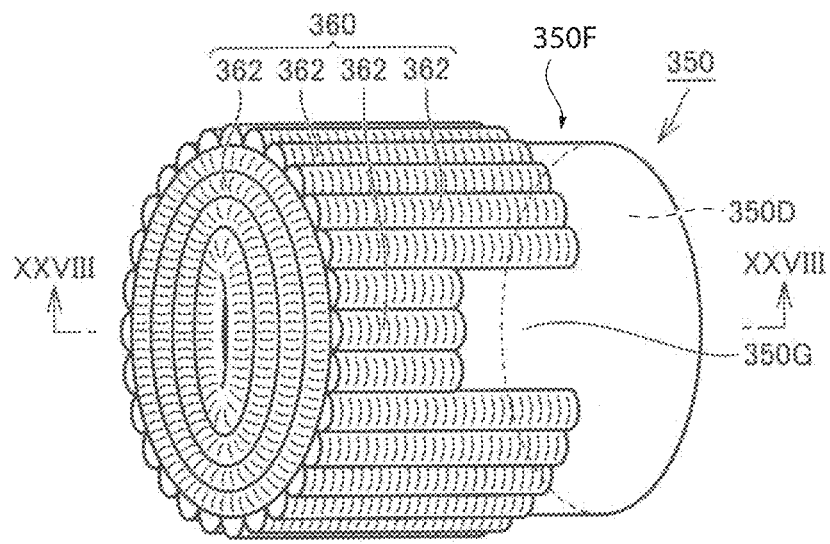
FIG. 27 is a schematic perspective view illustrating the method for producing the stationary-section external tooth of the crusher.
Figure 28:
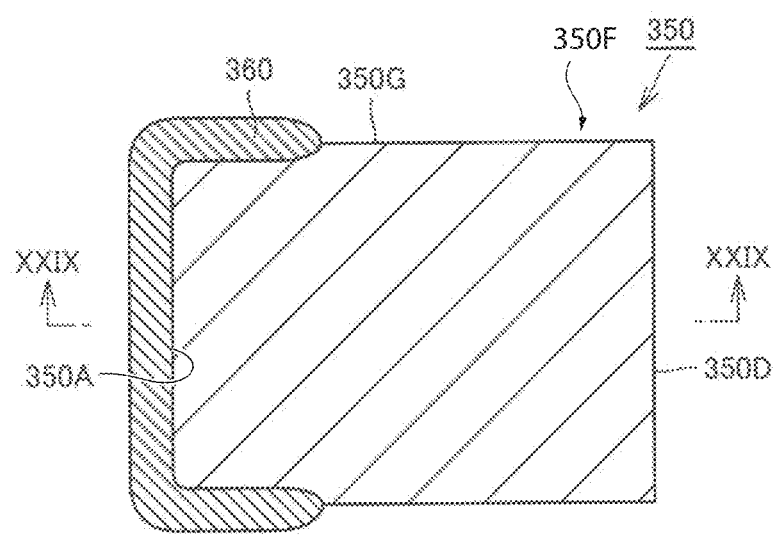
FIG. 28 is a schematic cross-sectional view illustrating the method for producing the stationary-section external tooth of the crusher.
Figure 29:
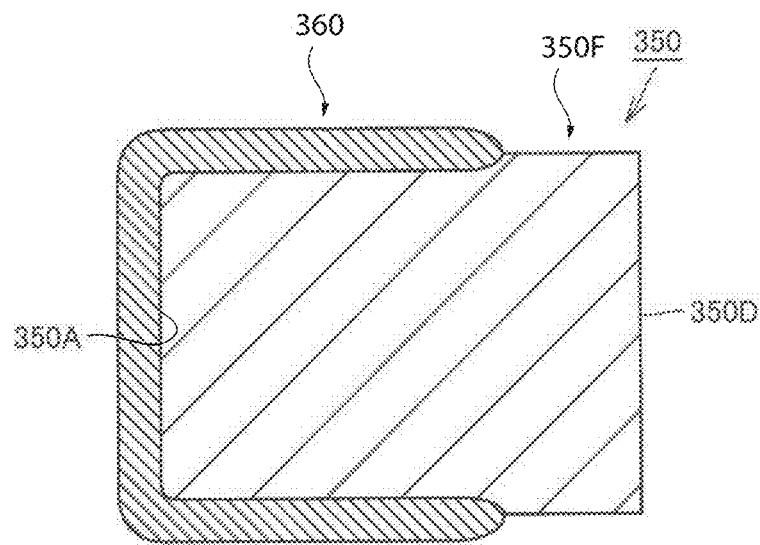
FIG. 29 is a schematic cross-sectional view illustrating the method for producing the stationary-section external tooth of the crusher.
Figure 30:
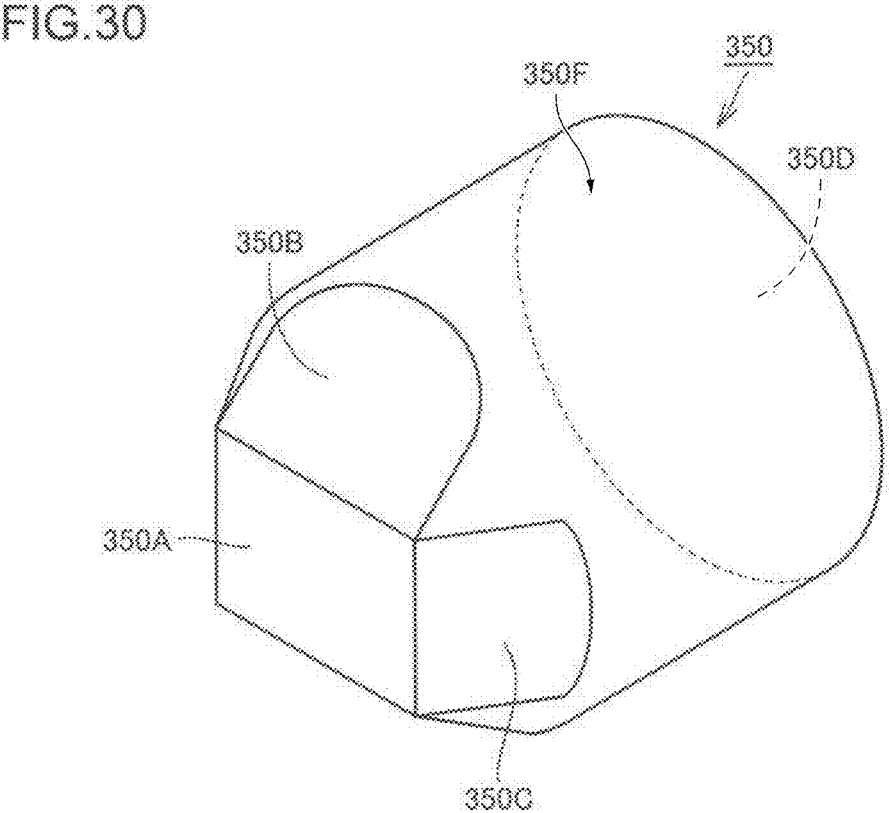
FIG. 30 is a schematic perspective view illustrating the method for producing the stationary-section external tooth of the crusher.
Figure 31:
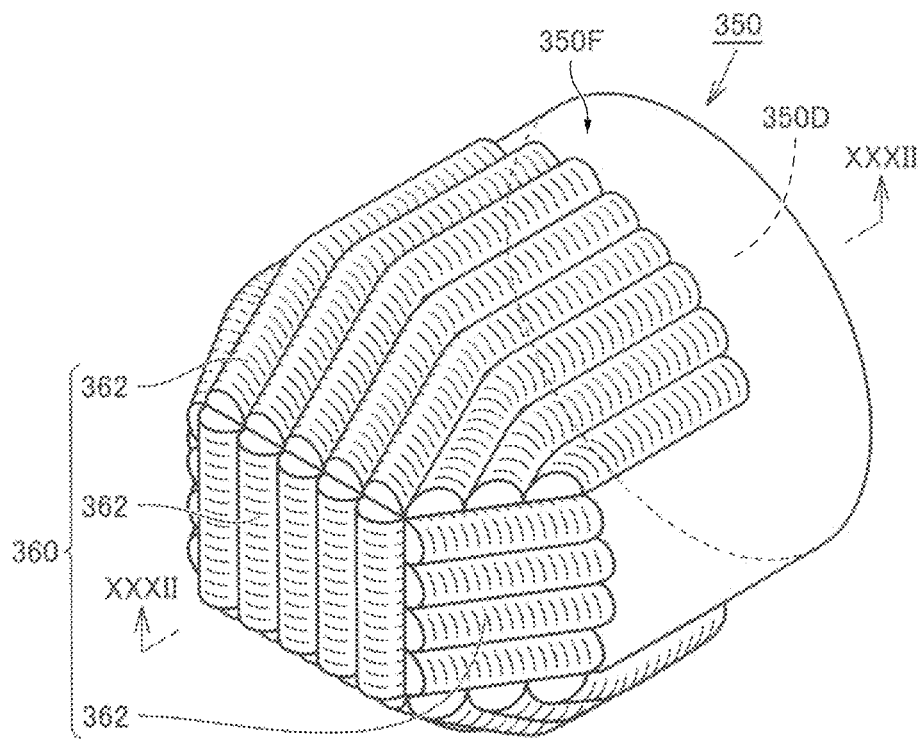
FIG. 31 is a schematic perspective view illustrating the method for producing the stationary-section external tooth of the crusher.
Figure 32:
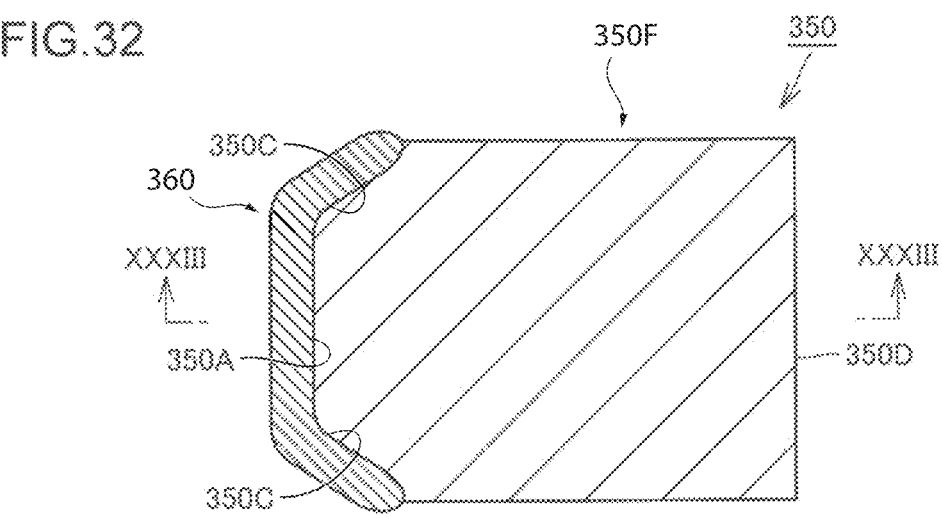
FIG. 32 is a schematic cross-sectional view illustrating the method for producing the stationary-section external tooth of the crusher.
Figure 33:
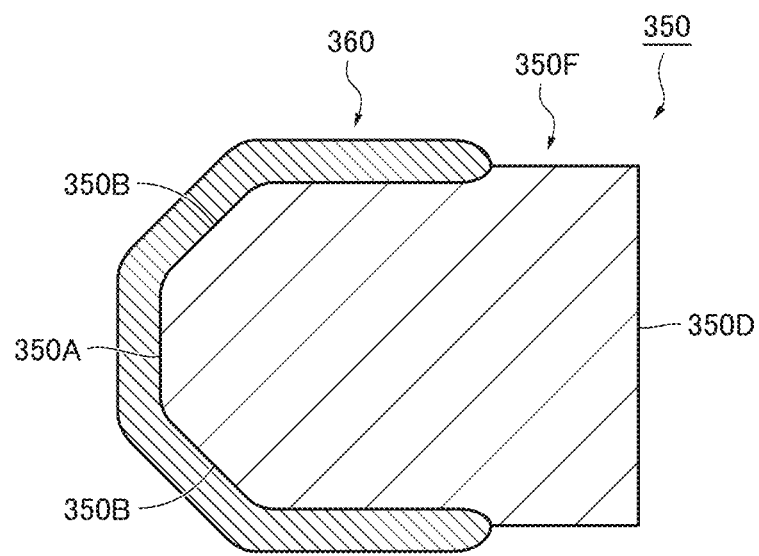
FIG. 33 is a schematic cross-sectional view illustrating the method for producing the stationary-section external tooth of the crusher.

A method for producing a stationary-section external tooth 321 will now be described. FIG. 8 is a flowchart schematically illustrating a method for producing a stationary-section external tooth, which is the machine component. FIGS. 26 and 27 are schematic perspective views illustrating a method for producing a stationary-section external tooth of a crusher. FIGS. 28 and 29 are schematic cross-sectional views illustrating the method for producing the stationary-section external tooth of the crusher. FIG. 28 is a schematic cross-sectional view taken along the line XXVIII-XXVIII in FIG. 27. FIG. 29 is a schematic cross-sectional view taken along the line XXIX-XXIX in FIG. 28. FIGS. 30 and 31 are schematic perspective views illustrating another method for producing the stationary-section external tooth of the crusher. FIGS. 32 and 33 are schematic cross-sectional views illustrating the other method for producing the stationary-section external tooth of the crusher. FIG. 32 is a schematic cross-sectional view taken along the line XXXII-XXXII in FIG. 31. FIG. 33 is a schematic cross-sectional view taken along the line XXXIII-XXXIII in FIG. 32.

Referring to FIG. 8, in the method for producing a stationary-section external tooth 321 in the present embodiment, first, a base member preparing step is carried out as a step S10. In this step S10, referring to FIG. 26, a base member 350, which is to be a base 325 of the stationary-section external tooth 321, is prepared. The base member 350 is made of a first metal. The base member 350 has a cylindrical shape including a first end face 350A, a second end face 350D, and a side face 350F.

Next, an overlay forming step is carried out as a step S20. In this step S20, referring to FIGS. 27 to 29, an overlay 360 is formed to cover the first end face 350A and a region on the first end face 350A side of the side face 350F of the base member 350 prepared in the step S10. The overlay 360 can be formed with a plurality of beads 362, as in the case of the first embodiment. The first end face 350A is entirely covered by the overlay 360. No overlay 360 is formed on the second end face 350D. On the side face 350F, a region within a predetermined distance in the axial direction from the region connected to the first end face 350A is covered with the overlay 360. While the overlay 360 on the side face 350F basically has a uniform length in the axial direction, it has a shorter length in a pair of regions symmetrical with respect to the center axis. Corresponding to these regions, on the side face 350F, projecting exposed regions 350G are formed which are uncovered with an overlay and projecting toward the first end face 350A. The overlay 360 can be formed by overlaying welding using $CO_2$ arc welding, as in the case of the first embodiment described above.

Next, a hot forging step is carried out as a step S30. In this step S30, the base member 350 with the overlay 360 formed in the step S20 is hot forged. Referring to FIGS. 27 to 29 and FIGS. 24 and 25, the base member 350 with the overlay 360 formed is heated to a temperature enabling hot forging, and then placed in a die having a cavity corresponding to a desired shape of the stationary-section external tooth 321, for forging. With hot forging, the overlay 360 formed in the step S20 is worked. As a result of hot forging, the first end face 350A and the second end face 350D become regions corresponding respectively to the tip end face 321A and the proximal end face 321D of the stationary-section external tooth 321. Of the side face 350F, the regions in the circumferential direction where the projecting exposed regions 350G have been formed become the third side faces 321C of the stationary-section external tooth 321, and the regions other than the regions where the projecting exposed regions 350G have been formed become the first side face 321B and the second side face 321E of the stationary-section external tooth 321.

As the base member 350 having the overlay 360 formed is hot forged, hard particles 91 that were protruding from a surface of the overlay 360 during formation of the overlay 360 are pressed into the overlay 360. As a result, in the stationary-section external tooth 321, the hard particles 91 located in the overlay surface region 90B are arranged side by side while being embedded in the overlay 90. The hard particles 91 located in the overlay surface region 90B are arranged in contact with the surface 90A of the overlay 90 (see FIG. 6). Among the hard particles 91 located in the overlay surface region 90B, any hard particle 91 having a region exposed from the surface 90A of the overlay 90 has an acute central angle θ (of less than 90°) corresponding to the exposed region. This prevents the hard particle 91 from falling off during the use of the stationary-section external tooth 321, leading to improved wear resistance of the stationary-section external tooth 321.

As the base member 350 having the overlay 360 formed is hot forged, in the stationary-section external tooth 321, protrusions 99 are formed in the overlay 90 in consequence of the hard particles 91 that were located in the vicinity of the interface between the overlay 360 and the base member 350 at the time of formation of the overlay 360. In a protrusion 99, at least a part of a corresponding hard particle 91 is received (see FIG. 7).

Referring to FIG. 8, next, a heat treatment step is carried out as a step S40. In this step S40, the stationary-section external tooth 321 obtained through hot forging in the step S30 is subjected to heat treatment. The heat treatment carried out in the step S40 is, for example, quenching and tempering. This imparts desired hardness and toughness to the base 325 of the stationary-section external tooth 321. Thereafter, the regions where no overlay 360 has been formed are subjected to machining for the purposes of improving dimensional accuracy, and so on. The stationary-section external tooth 321 in the present embodiment is thus completed.

It should be noted that in the above-described steps, from the standpoint of facilitating hot forging after formation of the overlay 360, preforming may be carried out prior to the formation of the overlay 360. Specifically, referring to FIGS. 26 and 30, a base member 350 having a cylindrical shape is prepared in the step S10, and then, the first end face 350A side is subjected to preforming. With this preforming, the first end face 350A is formed into a rectangular shape, and first chamfered portions 350B and second chamfered portions 350C are formed connected respectively to the long sides and the short sides of the first end face 350A.

Next, in the step S20, referring to FIGS. 31 to 33, an overlay 360 is formed to cover the first end face 350A, the first chamfered portions 350B, and the second chamfered portions 350C of the pre-formed base member 350. The first end face 350A is entirely covered with the overlay 360. No overlay 360 is formed on the second end face 350D. The overlay 360 extending in the axial direction is longer in length in the regions extending over the first chamfered portions 350B (see FIG. 33), than in the regions extending over the second chamfered portions 350C (see FIG. 32). Then, in the step S30, hot forging is carried out, whereby the first end face 350A and the second end face 350D become the regions corresponding to the tip end face 321A and the proximal end face 321D, respectively, of the stationary-section external tooth 321. The regions where the overlay 360 extends short in the axial direction become the third side faces 321C of the stationary-section external tooth 321, and the regions where the overlay 360 extends long become the first side face 321B and the second side face 321E of the stationary-section external tooth 321.

In each of the methods for producing the machine components in the first through third embodiments described above, when forming the overlay on the base member, a surface portion of the base member corresponding to the region of the base member where the overlay is to be formed may be removed in advance, or, an undercut portion may be formed in the base member, before formation of the overlay. This reduces the deformation amount of the overlay at the time of forging, thereby preventing, for example, wrinkling of the forged overlay.

Examples

A tooth 220 was produced through a similar procedure as the producing method described in the second embodiment, and the obtained tooth was subjected to a test to examine the structure of the overlay and the like (Example). For comparison, a tooth was produced in a similar producing method, except that the overlay forming step (step S20) was omitted, and an overlay was formed by overlaying welding after the heat treatment. The obtained tooth was subjected to a similar test (Comparative example). The dies used for hot forging in the Example and in the Comparative example were of the same shape.

Figure 34:
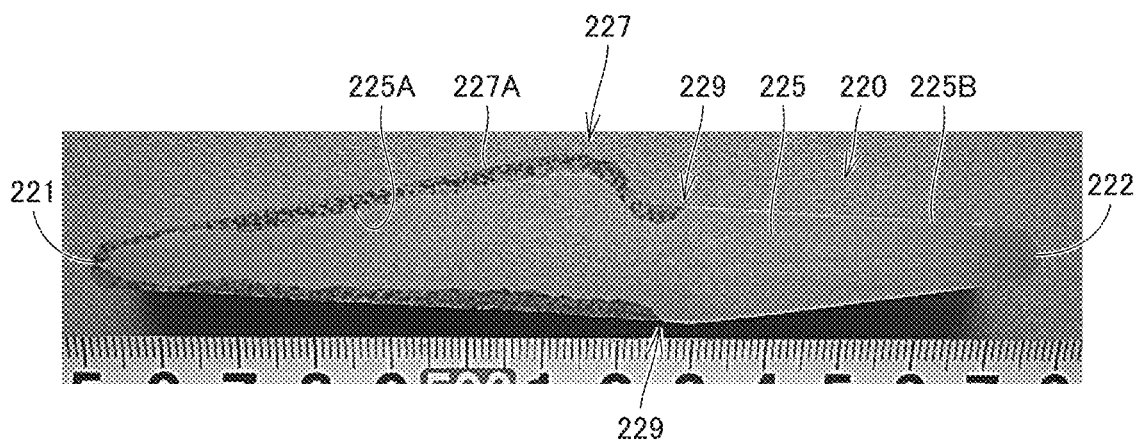
FIG. 34 is a photograph showing a cross section of a tooth.

FIG. 34 is a photograph showing a cross section of the tooth 220 of the Example. Referring to FIG. 34, in the overlay edge portion 229, the exposed region 225B and the surface 227A of the overlay 227 are flush with each other to form a forged surface. It is thus confirmed that the tooth 220 in the second embodiment can be produced by the producing method in the second embodiment. No cracking is seen between the overlay 227 and the base 225. No problem is found resulting from hot forging performed after the formation of the overlay.

FIG. 35 is an optical micrograph obtained by imaging a surface and its vicinity of the overlay of the Example. FIG. 36 is an optical micrograph obtained by imaging a surface and its vicinity of the overlay of the Comparative example. As shown in FIG. 36, in the overlay of the Comparative example, which has been formed by overlaying welding and not worked by forging thereafter, hard particles 91 protrude noticeably from the surface 90A of the overlay. Referring to FIG. 35, in the overlay of the Example, which has been formed and then worked by forging, hard particles 91 located in the surface region are arranged side by side in the state being embedded in the overlay (matrix 95). The hard particles 91 are aligned in contact with the surface 90A of the overlay. A hard particle 91 having a region exposed from the surface 90A of the overlay 90 has an acute central angle θ (of less than 90°) corresponding to the exposed region. This is presumably because, during the process in which the overlay is worked by forging, the hard particles 91 that were protruding from the surface 90A of the overlay are pressed into the matrix 95 having relatively low hardness.

Figure 38:
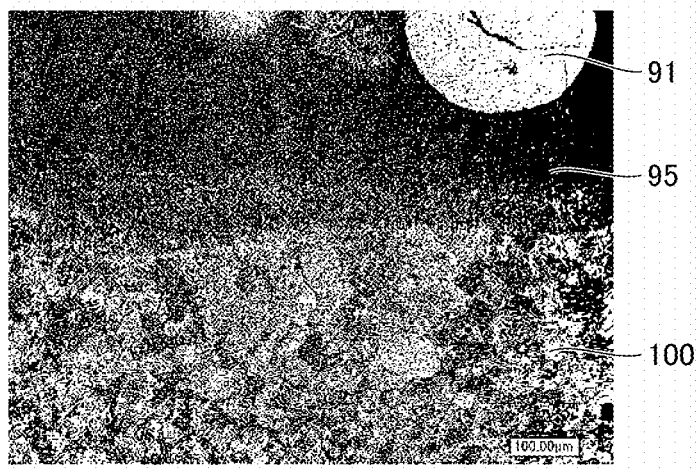
FIG. 38 is an optical micrograph showing an interface between an overlay and a base and its vicinity (Comparative example).

FIG. 37 is an optical micrograph obtained by imaging an interface between the overlay and the base and its vicinity of the Example. FIG. 38 is an optical micrograph obtained by imaging an interface between the overlay and the base and its vicinity of the Comparative example. As shown in FIG. 38, in the Comparative example where the overlay has been formed by overlaying welding and not worked by forging thereafter, the interface between the overlay (matrix 95) and the base 100 is flat. Referring to FIG. 37, in the Example which has been worked by forging after formation of the overlay, in the region including the interface between the overlay (matrix 95) and the base 100, protrusions 99 are formed with the overlay (matrix 95) protruding toward the base 100. In each protrusion 99, a part of a corresponding hard particle 91 is received. It is considered that the protrusions 99 have been formed while the overlay was worked by forging, in consequence of the hard particles 91 present in the vicinity of the interface with the base member. A hard particle 91 that has contributed to the formation of a protrusion 99 has at least a part received in the protrusion 99.

While the sprocket wheel and the bushings as the tracked undercarriage components, the bucket teeth for a hydraulic excavator, and the teeth for a crusher have been described as examples of the machine components of the present invention in the above embodiments, the machine components of the present invention are not limited thereto. The present invention is widely applicable to the machine components in which an overlay having hard particles dispersed in a matrix is formed.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The machine component and its producing method according to the present invention are applicable particularly advantageously to a machine component for which improved wear resistance is desired and to its producing method.

DESCRIPTION OF REFERENCE NUMERALS

1: track travel device; 2: track; 3: track frame; 4: idler tumbler; 5: sprocket wheel; 6: track shoe; 7: outer link; 8: inner link; 9: track link; 10: track roller; 11: carrier roller; 12: connecting pin; 13: bushing; 15: through hole; 50: base; 51: projection; 52: overlay; 53: outer peripheral surface; 59: burr; 61: base member; 61A: side face; 61B: end face; 62: bead; 63: overlay; 64: base member; 64A: outer peripheral surface; 64B: end face; 70: welding torch; 71: welding nozzle; 72: contact tip; 73: welding wire; 74: arc; 80: hard particles supplying nozzle; 90: overlay; 90A: surface; 90B: overlay surface region; 91: hard particle; 92: molten pool; 95: matrix; 99: protrusion; 100: base; 131: outer peripheral surface; 132: overlay; 133: inner peripheral surface; 134: base; 139: smaller-diameter portion; 201: bucket; 210: main body; 212: periphery of opening; 220: tooth; 221: tip end; 222: proximal end; 225: base; 225A: covered region; 225B: exposed region; 227: overlay; 227A: surface; 229: overlay edge portion; 230: mounting portion; 250: base member; 251: side face; 251A: covered region; 252: one end face; 252A: first chamfered portion; 253: other end face; 253A: second chamfered portion; 259: overlay edge portion; 260: overlay; 301: crusher; 310: main frame; 320: stationary section; 321: stationary-section external tooth; 321A: tip end face; 321B: first side face; 321C: third side face; 321D: proximal end face; 321E: second side face; 322: crusher plate; 323: recess; 325: base; 327: overlay; 330: movable section; 331: movable-section external tooth; 333: movable-section internal tooth; 350: base member; 350A: first end face; 350B: first chamfered portion; 350C: second chamfered portion; 350D: second end face; 350F: side face; 350G: projecting exposed region; 360: overlay; and 362: bead.

The invention claimed is:

1. A machine component, comprising:
a base made of a first metal; and
an overlay disposed in contact with the base to cover at least a part of a surface of the base, the overlay including
a matrix made of a second metal, and
hard particles dispersed in the matrix and having a higher hardness than the matrix,
the overlay having a forged surface, and
the hard particles located in an overlay surface region being arranged side by side and being embedded in the overlay, the overlay surface region being a region within an average particle diameter of the hard particles from the surface of the overlay, wherein:
in an interface region that includes an interface between the overlay and the base, the overlay includes a protrusion that protrudes toward the base;
the protrusion has at least a part of a hard particle of the hard particles received therein; and
none of the hard particles have a center which is located inside of the protrusion.

2. The machine component according to claim 1, wherein the hard particles located in the overlay surface region are arranged in contact with the surface of the overlay.

3. The machine component according to claim 1, wherein among the hard particles located in the overlay surface region, any hard particle having a region exposed from the surface of the overlay has an acute central angle corresponding to the region exposed from the surface of the overlay.

4. The machine component according to claim 1, wherein the machine component is a component of a tracked undercarriage, a bucket tooth, or a tooth of a crusher.

5. A method for producing a machine component, comprising the steps of:
preparing a base member made of a first metal;
forming an overlay to cover at least a part of a surface of the base member, the overlay including a matrix made of a second metal and hard particles dispersed in the matrix, the hard particles having a higher hardness than the matrix; and
forging the base member after the overlay is formed on the base member such that the overlay is worked, wherein:
in an interface region that includes an interface between the overlay and the base, the overlay includes a protrusion that protrudes toward the base;
the protrusion has at least a part of a hard particle of the hard particles received therein; and
none of the hard particles have a center which is located inside of the protrusion.

6. The machine component producing method according to claim 5, wherein the step of forging the base member includes hot forging the base member.

7. The machine component producing method according to claim 5, wherein the machine component is a component of a tracked undercarriage, a bucket tooth, or a tooth of a crusher.

* * * * *